(12) United States Patent
Caputo et al.

(10) Patent No.: US 7,296,726 B2
(45) Date of Patent: Nov. 20, 2007

(54) SYSTEM FOR WELDING MOTOR-VEHICLE BODIES

(75) Inventors: Salvatore Caputo, Grugliasco (IT); Flavio Goffi, Grugliasco (IT)

(73) Assignee: Comau, S.p.A. (IT)

( * ) Notice: Subject to any disclaimer, the term of this patent is extended or adjusted under 35 U.S.C. 154(b) by 320 days.

(21) Appl. No.: 10/997,115

(22) Filed: Nov. 24, 2004

(65) Prior Publication Data

US 2005/0269382 A1 Dec. 8, 2005

(30) Foreign Application Priority Data

Jun. 8, 2004 (EP) .................................. 04425422

(51) Int. Cl.
B23K 37/04 (2006.01)
(52) U.S. Cl. ..................................... 228/49.1; 219/158
(58) Field of Classification Search ................. 228/4.1, 228/44.3, 47.1, 49.1, 49.4, 212; 29/33 P, 29/78.3, 786, 791, 792, 822, 823, 824; 219/79, 219/80, 158, 161
See application file for complete search history.

(56) References Cited

U.S. PATENT DOCUMENTS

| | | | | |
|---|---|---|---|---|
| 4,494,687 A | | 1/1985 | Rossi | ........................... 228/47 |
| 4,682,722 A | * | 7/1987 | Bossotto et al. | .............. 228/4.1 |
| RE36,541 E | * | 2/2000 | Rossi | .......................... 228/6.1 |
| 6,138,889 A | * | 10/2000 | Campani et al. | .............. 228/4.1 |
| 6,691,392 B2 | * | 2/2004 | Savoy et al. | .............. 29/407.09 |
| 6,932,263 B2 | * | 8/2005 | Kilabarda et al. | .......... 228/49.1 |
| 2003/0037432 A1 | * | 2/2003 | McNamara | ................... 29/771 |
| 2003/0189085 A1 | | 10/2003 | Kilabarda et al. | ............ 228/212 |

FOREIGN PATENT DOCUMENTS

EP 0642878 B1 3/1995
GB 2172555 9/1986

* cited by examiner

Primary Examiner—Kevin P. Kerns
(74) Attorney, Agent, or Firm—Young Basile

(57) ABSTRACT

A system for the welding of motor-vehicle bodies comprises a conveying line, for carrying the motor-vehicle bodies to be welded through a welding station, and a plurality of pairs of side gates mobile on guide means, the gates of each pair being adapted to the configuration of a corresponding type of body to be welded. According to the invention there is provided a plurality of tractors, which are independent with respect to said side gates, each tractor being selectively coupleable in an automatic way to side gates of different pairs, for the purposes of displacement of the latter between an active position, close to the welding station, and at least one parking position, remote from the welding station.

7 Claims, 26 Drawing Sheets

SYSTEM FOR WELDING MOTOR-VEHICLE BODIES

SUMMARY OF THE INVENTION

The present invention relates to a system for welding structures consisting of elements of pressed sheet metal, such as motor-vehicle bodies or their subassemblies, said system being designed to operate in an automatic way on a plurality of different types of structure to be welded (for example, motor-vehicle bodies of different models of motor vehicle, or motor-vehicle bodies of different versions, such as saloons, station-wagons, convertibles, etc., of the same model of motor vehicle, or again, for example, single subassemblies, such as flat boot panels, under-panels, or side panels, of different models of motor-vehicle body). Systems of the type specified above are known (see, for example, GB-A-2 172 555 and EP-A-0 642 878 in the name of the present applicant), which comprise:

a welding station;

a conveying line, for carrying the structures to be welded, or at least part thereof, through the welding station; and a plurality of pairs of side gates provided with means for clamping structures to be welded during the welding operation and such as can be guided along the conveying line, said clamping means provided on the side gates of each pair being adapted to the configuration of a corresponding type of structure to be welded.

In said known systems, the side gates are mobile on guide means provided at the side of the conveying line to enable replacement, according to the type of structure to be welded, of the pair of side gates that is located in the vicinity of the welding station. Each side gate is displaceable between a first position, close to the welding station, and at least one second position, remote from the welding station.

In addition, each pair of side gates, when located in the aforesaid first position close to the welding station, may be displaced between an open condition and a closed condition, in which the respective means for clamping of the side gates are operative for clamping parts of the structure to be welded in a welding configuration on the welding station. The system moreover comprises means for moving the side gates, for their displacement between the respective first and second positions. In some known solutions, the guide means of the side gates comprise fixed structures that carry above them overhead rails, on which the gates themselves are slidably mounted, whilst in other solutions the gates are, instead, self-moving units that move along guides fixed to the ground. The pairs of gates are displaced between the respective first and second positions in the aforesaid open condition, until they reach a position corresponding to the welding station. In said position, the pair is brought into the closed condition, with the gates that provide the suitable clamping of the parts to be welded. Welding is then carried out using programmable automatic welding means, for example programmable robots provided with electrical spot welding heads and/or laser welding heads.

In order to facilitate the use of various types of side gates, a known technique is to equip the system with suitable stores, from which the required pair of side gates is picked up according to the type of structure to be welded and where the gates used for the welding operation just concluded are parked, awaiting a subsequent use.

Irrespective of the type of guides used, whether overhead ones or ones on the ground, and of the presence of possible stores, the movement of the gates is obtained by equipping each of them with motor means.

In light of what is set forth above, the present invention proposes a further improvement in the known systems, by simple and low-cost means.

The above purpose is achieved, according to the invention, through a system for the welding of structures made of pressed sheet metal, in particular motor-vehicle bodies or their subassemblies, said system having the characteristics indicated in the annexed claims, which are to be understood as forming an integral part of the present description.

BRIEF DESCRIPTION OF THE DRAWINGS

Further purposes, characteristics and advantages of the invention will emerge from the ensuing description, with reference to the annexed drawings, which are provided purely by way of non-limiting example and in which.

DETAILED DESCRIPTION OF THE INVENTION

Figure 1:
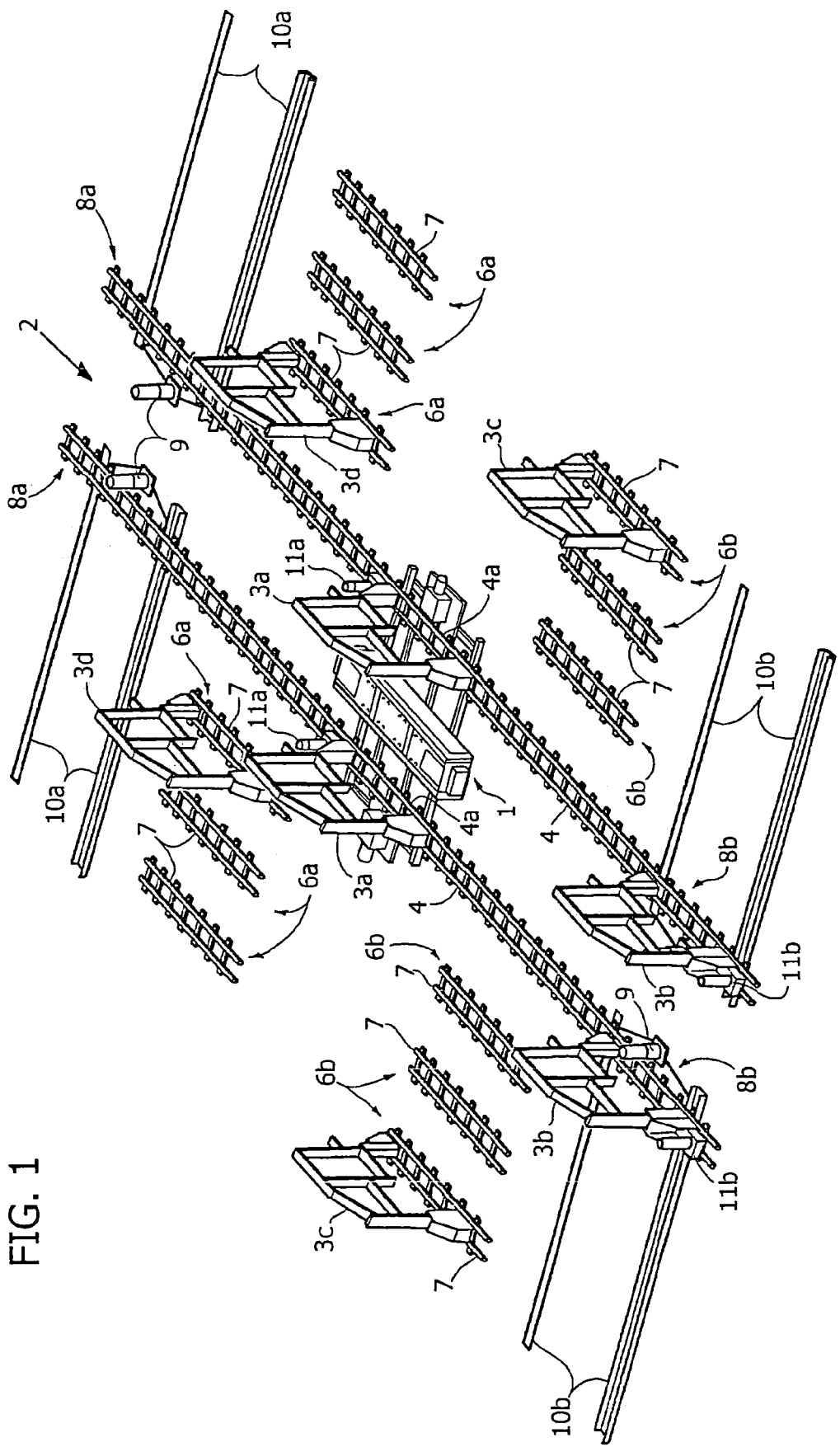
FIG. 1 is a schematic perspective view of a welding system according to the invention.

The welding system according to the invention, illustrated by way of example in the annexed drawings, is designed to operate on a plurality of different types of motor-vehicle bodies. For the above purpose, as may be seen in FIGS. 1 and 2, the system comprises a welding station 1 set along an appropriate conveying line, represented only schematically by the arrow 2, used for carrying the motor-vehicle bodies to be welded through the welding station 1. The station 1 is not illustrated in detail in so far as it is of a conception as a whole known, with the exception of some of its specific innovative aspects, which will be described hereinafter. The welding equipment provided at the station 1 may consist of robots of a known type, the control unit of which contains a set of different operating programs, selected as required each time according to the type of motor-vehicle body to be welded.

Given that the conveying line 2 and the means for obtaining the displacement of the motor-vehicle bodies along said line can be of any known type, said elements have not been illustrated in the annexed drawings in so far as they do not fall within the scope of the present invention. Their elimination from the drawings moreover renders the latter more immediately understandable. It is evident in any case that the way in which the motor-vehicle body to be welded is formed in the welding station can be any whatsoever. For example, the motor-vehicle body can be entirely pre-assembled in a provisional way upstream of the welding station, or else the various subassemblies constituting the motor-vehicle body can be carried along the conveying line 2 to the welding station in an as yet unassembled condition, the assembly prior to the welding operation being carried out in the station itself. Alternatively, the conveying line 2 can carry only part of the motor-vehicle body, for example the under-panel, to the welding station, in which case, the assembly of the complete motor-vehicle body is carried out in the welding station, causing the remaining components of the body to arrive there. Furthermore, the system according to the invention is of course usable also for the welding of single subassemblies of motor-vehicle bodies, or again, in theory, for any other type of structure made of welded sheet metal, designed to be produced in different types or models or versions. Whatever the way in which the motor-vehicle body is assembled, it is necessary to clamp each part of the body in a precise position, when the body undergoes the welding operations in the station 1. Said clamping is obtained by means of positioning and clamping tools carried by pairs of operatively interchangeable side gates, designated by 3a, 3b, 3c and 3d in FIG. 1, which can run on longitudinal bottom rails or guides 4. Where it is not strictly necessary for the purposes of the detailed description of the operation of the system according to the invention, the side gates 3a, 3b, 3c and 3d will be in what follows identified only by the reference number 3.

In the case exemplified, the guides 4 extend parallel to the line 2 for conveying the motor-vehicle bodies and are fixed directly to the ground, with the exception of one of their respective intermediate portions, designated by 4a, located in a position corresponding to the welding station 1. As will emerge clearly from what follows, the portions 4a of the guides 4 are such as can be translated in a direction substantially perpendicular to the longitudinal development of the guides themselves, for carrying the side gates 3 of the pair in use on the welding station 1 in the respective closed condition.

The pairs of side gates 3 can be displaced along the guides 4 so as to bring, into a position corresponding to the welding station 1, a pair of side gates corresponding to the type of body to be welded. When a body of a type different from that on which the welding station has operated immediately before reaches the station 1, the pair of side gates that is located in the station itself can be rapidly replaced by means of sliding in the respective guides 4, as will emerge from what follows.

For the above purpose, in the case exemplified, there are provided two stores of gates, each comprising a series of stations 6a, 6b arranged on the two sides of the conveying line 2 and of the guides 4, where each parking station comprises a guide section 7, of a shape similar to that of the guides or rails 4 and thus designed to support in a slidable way a respective side gate. In the case exemplified, the guide sections 7 extend substantially parallel to the guides 4.

In the example illustrated, on each side of the conveying line 2 there are provided two stores, each comprising three different stations 6a, 6b, which correspond to a total maximum number of six different types of gates 3, designed to operate on as many types of motor-vehicle bodies. Of course, in any case the two stores can be provided with any number of parking stations, with the limits that will be illustrated in what follows.

The various gates 3 carry, in a way in itself known, respective positioning and clamping tools (not illustrated), designed to engage the side and top parts of the body in such a way as to clamp them in a precise position during execution of the welding operations on the station 1. The bottom part of the body is instead clamped by means of further positioning and clamping tools provided on the bottom part of the welding station 1. Each pair of side gates 3 is in particular provided with positioning and clamping tools suited to the particular configuration of a respective type of body.

In the use of the system, positioned as required each time on the guides 4 is a first pair of side gates 3, in the working position, corresponding to the type of body that is located each time in the welding station 1, and a second pair of gates 3, in a waiting position, corresponding to the type of body to be welded immediately afterwards. When the latter body enters the welding station 1, the first gates 3 are brought into a waiting position and the second gates 3 into the working position.

According to an important aspect of the invention, in a position corresponding to the two longitudinal ends of the guides 4 there are provided respective translatable guide elements 8a, 8b, of a shape similar to that of the guides 4. The translatable elements 8a, 8b are equipped with respective motor and drive means 9, in order to be displaced laterally, for example on respective pairs of rails 10a, 10b, in a direction perpendicular to the longitudinal development of the guides 4, between a first position and a plurality of second positions. In the aforesaid first position, each translatable element 8a, 8b is longitudinally aligned to a respective guide 4 so as to constitute a sort of prolongation thereof. Via the aforesaid lateral displacement, each element 8a, 8b can be brought into a position corresponding to a respective parking station 6a, 6b, i.e., to a guide section 7.

According to an important aspect of the invention, the movement of the side gates 3 of the various pairs is provided by means of independent tractors, each of which can co-operate with different side gates 3 in order to pick them up from a respective parking station 6a or 6b and bring them into the operative position corresponding to the station 1, and vice versa. In the case illustrated in FIG. 1, two pairs of tractors are provided, designated by 11a and 11b, which are selectively coupleable to the various gates, with the modalities that will be described hereinafter.

The general operation of the welding system according to the invention will now be described with reference to FIGS. 2-20. For the above purpose, suppose that in the welding station 1 there is a body of a first type, referred to as type a), the parts of which are clamped in a precise position during the welding operation by positioning tools carried by the pair of side gates 3a. The body that is located in the welding station 1 is to be followed by a body of a second type, referred to as type b), where the positioning tools provided for clamping the various parts of the body of type b) during execution of the welding operation are provided on the pair of side gates 3b. Likewise, the body of type b) will be followed by a body of a third type, or type c), and this in turn by a body of a fourth type, or type d), to each of which is associated a respective type of side gates 3c and 3d.

As will be seen, the substitution of a body in the welding station 1 is accompanied by a corresponding substitution of the pairs of side gates to be used on the station itself, along the guides 4 in such a way as to bring one pair of gates 3 into a waiting position and the other pair of gates 3 into the operative position, in the welding station.

Once it has arrived in the operative position, each pair of side gates is displaceable between an open condition, to enable entry into the welding station 1 of the new body to be welded, and a closed condition, in which the positioning tools of the side gates engage the side and top parts of the body to clamp them in a precise position. As previously mentioned, the aforesaid movement is obtained via translation of the portions 4a of the guides 4, the modalities of actuation of which constitute another important aspect of the invention, described hereinafter. Clamping of the gates 3 in the closed condition, with respect to the welding station is obtained via means in themselves known.

Figure 2:
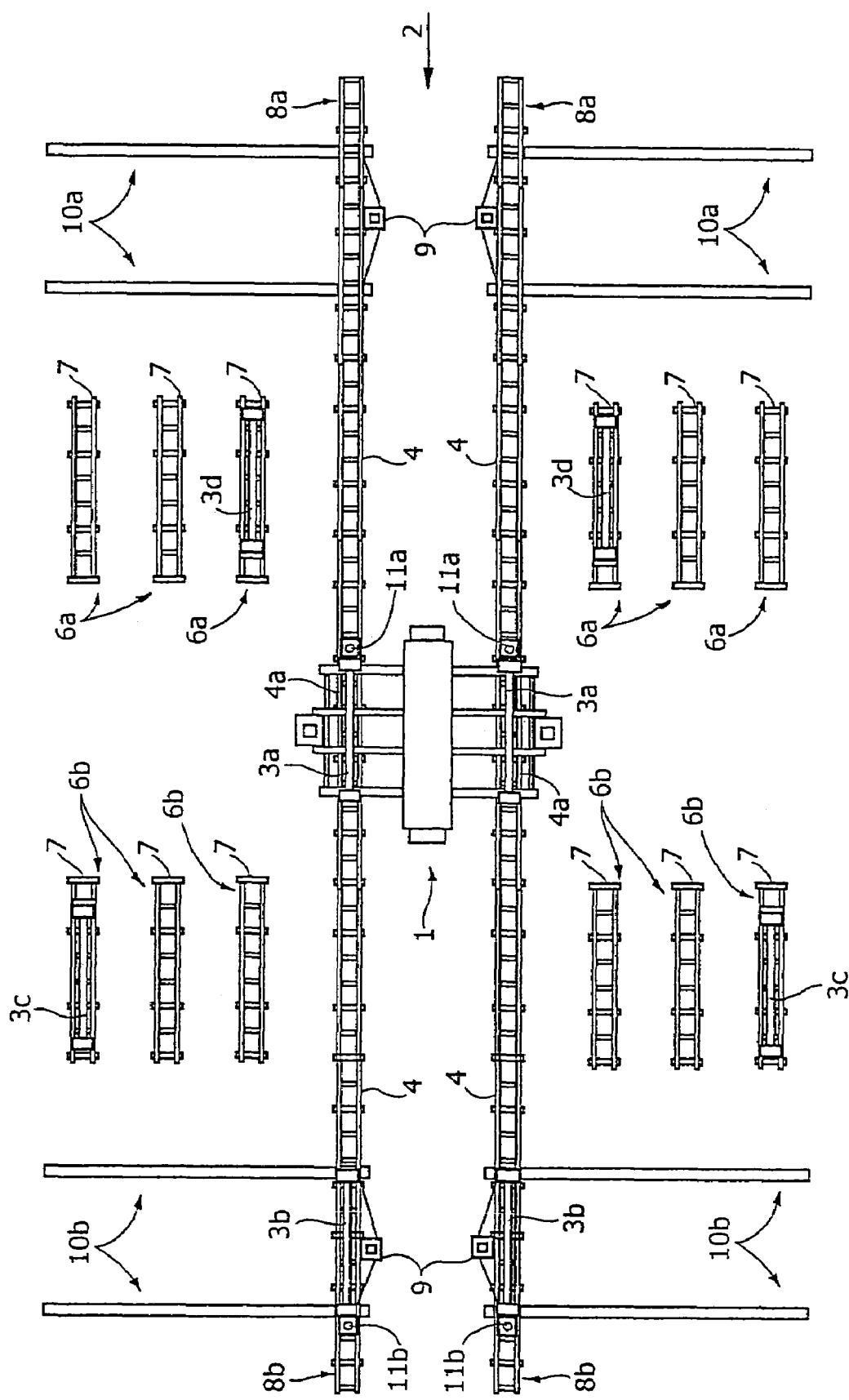
FIGS. 2-20 are schematic plan views of the system of FIG. 1 in as many different conditions of operation.

FIGS. 1 and 2

Present on the station 1 is a motor-vehicle body of type a), and in a position corresponding to the station itself, on the mobile guide portions 4a there are located the two side gates 3a, set in the open condition and coupled to the respective tractors 11a. The gates 3b designed for processing the body of type b) that is next to undergo the welding process on the station 1, with coupled thereto the respective tractors 11b, are on the translatable elements 8b, which are aligned at the exit end of the guides 4. The gates 3c, 3d are in a parking position in respective stations 6b and 6a.

FIG. 3

The two gates 3a are brought into the closed condition to keep the parts of the motor-vehicle body to be welded in position via translation of the mobile guide portions 4a, thereby uncoupling from the respective tractors 11a. The tractors 11b displace the gates 3b from the elements 8b, pushing them on the guides 4, until they are brought into a waiting position, in the neighbourhood of the station 1.

FIG. 4

Once the welding operation is terminated on the body of type a), the gates 3a are brought into the respective opening position via translation of the mobile guide portions 4a, with their consequent new coupling to the respective tractors 11a.

FIG. 5

The tractors 11a displace the gates 3a from the station 1, pulling them along the guides 4, whilst the tractors 11b push the gates 3b until they come into a position corresponding to the station 1, on the mobile guide portions 4a, where they are in the open condition. Simultaneously, the welded body of type a) is removed from the station 1, and carried on the latter is a body of type b).

FIG. 6

The tractors 11a climb onto the translatable elements 8a, until they bring also the gates 3a onto them. The two gates 3b are brought into a closed condition on the station 1, via translation of the mobile guide portions 4a, to keep the parts of the new body of type b) to be welded in position, thus also obtaining their uncoupling from the respective tractors 11b.

FIG. 7

The elements 8a are translated laterally, on the rails 10a, taking along with them the respective gates 3a, until they each come into a position corresponding to a respective free parking station 6a. The tractors 11b, no longer constrained to the gates 3b, displace, instead, along the guides 4, until they climb onto the initial stretch of the respective translatable elements 8b.

FIG. 8

The tractors 11a push the gates 3a, so as to unload them, from the elements 8a, onto respective stations 6a. The elements 8b are translated laterally, on the respective rails 10b, until they each come into a position corresponding to the parking station 6b, which bears a respective gate 3c at the end of said lateral translation, the tractors 11b are coupled to the respective gates 3c.

FIG. 9

The elements 8a are translated laterally, on the rails 10a, until they return into alignment with respect to the guides 4, taking along with them the tractors 11a. Said lateral translation brings about uncoupling of the tractors 11a from the gates 3a, which are by now parked in the respective stations 6a. The tractors 11b pull the gates 3c, displacing them from the respective stations 6b onto the translatable elements 8b.

FIG. 10

The elements 8b are translated laterally, on the rails 10b, until they return into alignment with respect to the guides 4, taking along with them the gates 3c, with associated thereto the respective tractors 11b. The tractors 11a are brought into the proximity of the station 1, in a position such as to enable coupling to the gates 3b when these are brought into the open position on the station 1.

FIG. 11

When the welding operations on the motor-vehicle body of type b) are concluded, the gates 3b are brought into the respective opening position, with their consequent coupling to the tractors 11a, via translation of the mobile guide portions 4a. The tractors 11b displace the gates 3c from the elements 8b, pushing them onto the guides 4, until they are brought into in a waiting position in the neighbourhood of the station 1.

FIG. 12

The tractors 11a displace the gates 3b, pulling them along the guides 4, whilst the tractors 11b push the gates 3c until they come into a position corresponding to the station 1, where they are in the open condition on the mobile guide portions 4a. Simultaneously, the body b), by now welded, is removed from the station 1, and a body of type c) is carried on the latter.

FIG. 13

The tractors 11a climb onto the translatable elements 8a until they carry on them also the respective gates 3b. The two gates 3c are brought, in a closed working condition, onto the station 1, via translation of the mobile guide portions 4a, to keep the parts of the new motor-vehicle body to be welded in position, thus also obtaining their uncoupling from the respective tractors 11b.

FIG. 14

The tractors 11b, which are no longer constrained to the gates 3c, remain stationary on the guides 4.

FIG. 15

The tractors 11a push the gates 3b so as to unload them from the elements 8a onto the respective parking stations 6a.

FIG. 16

The elements 8a are translated laterally, on the rails 10a, obtaining uncoupling of the tractors 11a from the gates 3b, which are by now parked. The translation proceeds until said elements 8a arrive in alignment with respect to the stations 6a in which the gates 3d are located, also achieving coupling of the tractors 11a to said gates 3d upon reaching said position.

FIG. 17

The tractors 11a pull the gates 3d, displacing them from the respective stations 6a on the translatable elements 8a.

FIG. 18

The elements 8a are translated laterally on the rails 10a until they return into alignment with respect to the guides 4, taking along with them the gates 3d and associated thereto, the respective tractors 11a.

FIG. 19

When the welding operations on the motor-vehicle body of type c) are concluded, the gates 3c are brought into the respective opening position on the station 1, via translation of the mobile guide portions 4a, with consequent coupling to the tractors 11b. The tractors 11a, instead, displace the gates 3d from the translatable elements 8a, pushing them on the guides 4, until they bring them into a waiting position, in the neighbourhood of the station 1.

FIG. 20

The tractors 11b displace the gates 3c from the station 1, pulling them along the guides 4, whilst the tractors 11a push the gates 3d on the guides 4, until they come into a position corresponding to the station 1, where they are in the open condition. Simultaneously, the motor-vehicle body of type c), by now welded, is removed from the station 1, and a body of type d) is carried on the latter.

Next, the gates 3c will be parked in respective stations 6b, following a procedure similar to the one previously described with reference to the gates 3a and 3b, but in this case using the tractors 11b and the translatable elements 8b. The same may be said as regards picking-up, replacement, and parking of the gates now present in the stations 6a.

In the example illustrated, as may be seen, the stores 6a, 6b are exploited only partially, since they would be suited to receiving two additional pairs of gates 3, should the requirements of production so dictate. It is evident in any case that the system according to the invention can be provided with stores having any number of places, it remaining understood that there exists a practical limit to the increase in the number of places owing to the space available and above all to the need to carry out the operations of exchange between a pair of gates adjacent to the welding station and a pair of gates in the store within an interval of time not longer than the duration of the cycle of welding operations in order to enable, at the end of the welding process, the new pair of gates corresponding to a subsequent motor-vehicle body to be welded of a type different from the one that is already completed, to be ready to undergo processing.

It is moreover evident that the stores are not exploited in the case where the series of motor-vehicle bodies fed into the welding station 1 are all of one and the same type, or only of two different types, in which case the two corresponding types of gates are exchanged simply with a longitudinal movement between the first position and the second position by means of the respective tractors.

From the foregoing description it emerges how the use of the tractors 11a, 11b selectively coupleable to various types of gates avoids the necessity, typical of the known art, of having to associate motor means to each gate.

Figure 21:
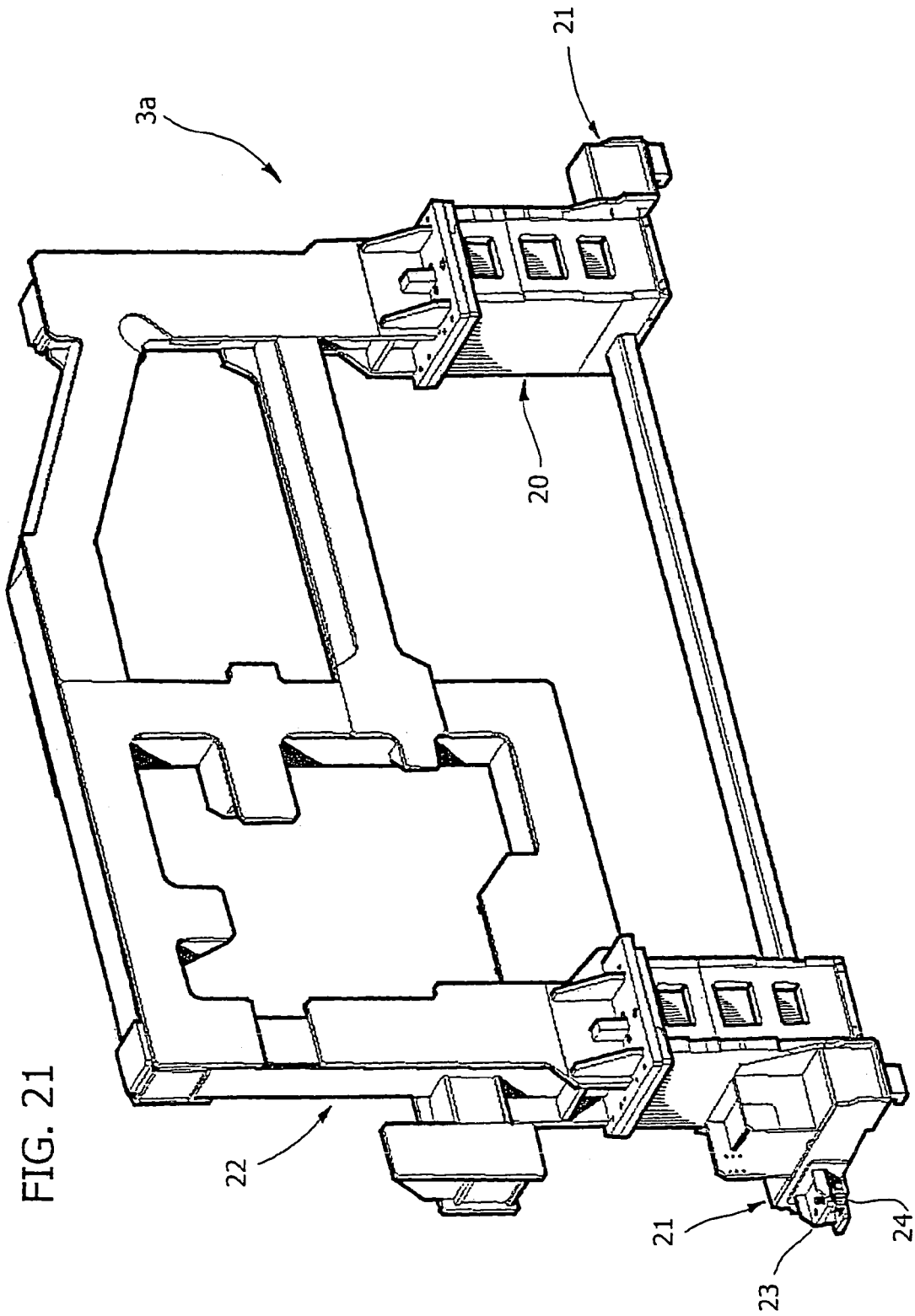
FIG. 21 is a schematic perspective view of a side gate used in the system according to the invention.

FIG. 21 illustrates a possible embodiment of one of the gates used in the system according to the invention.

Figure 24:
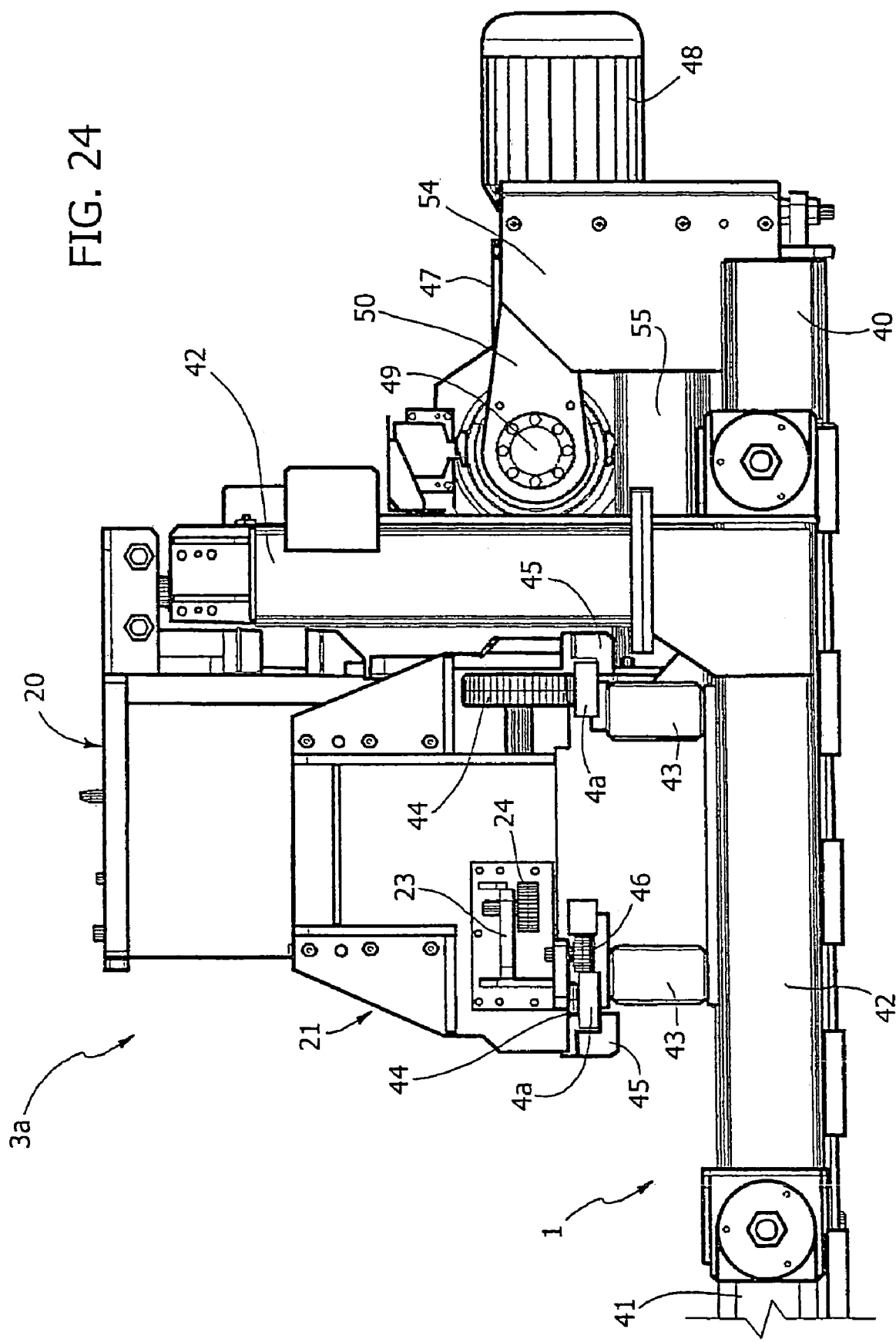
FIG. 24 is a schematic side view, in partial cross section, of an arrangement for translation of side gates associated to a welding station of the system according to the invention, in a first operative condition.
Figure 25:
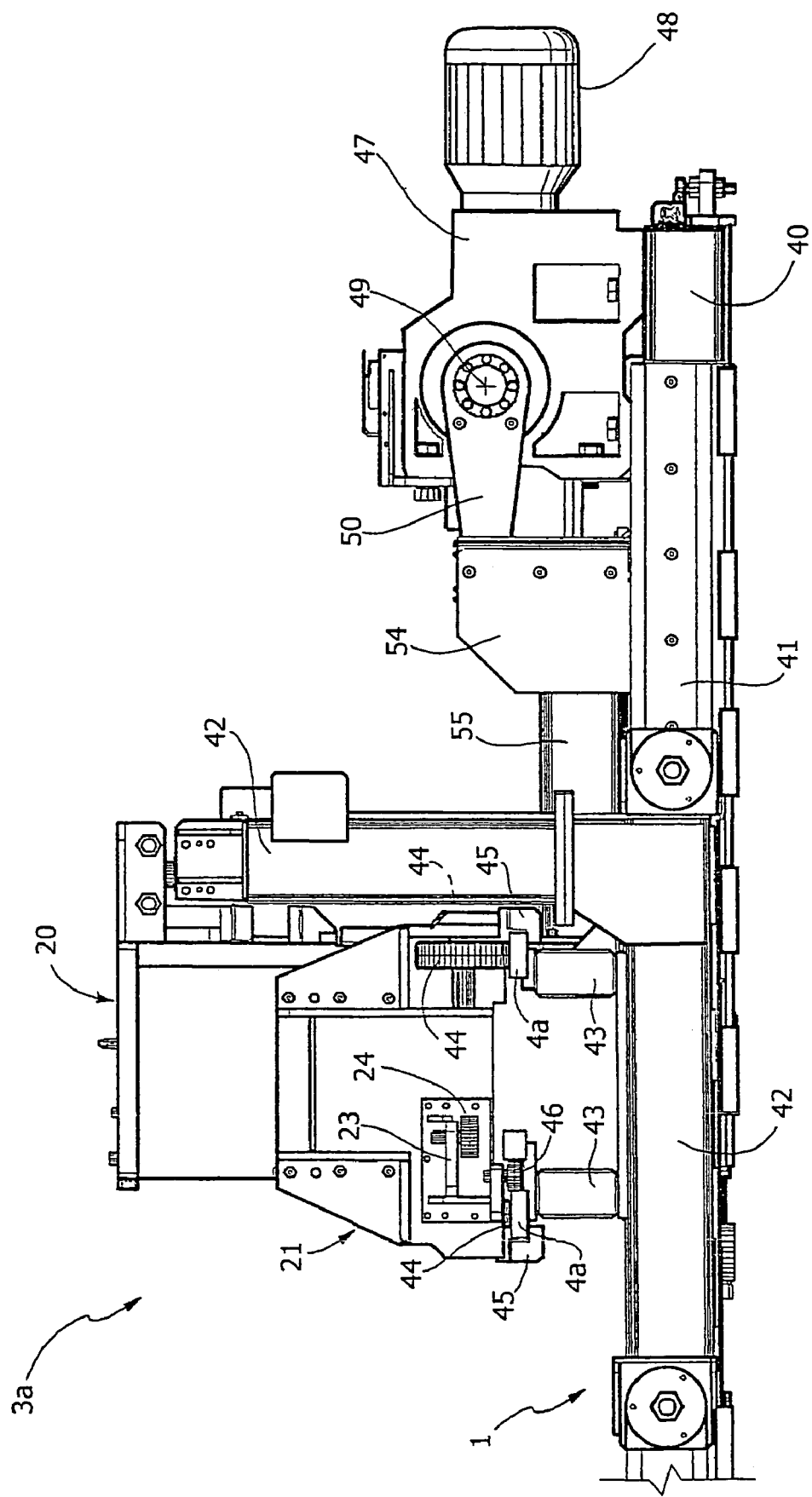
FIG. 25 is a schematic side view, in partial cross section, of the arrangement of translation illustrated in FIG. 24, in a second operative condition.
Figure 26:
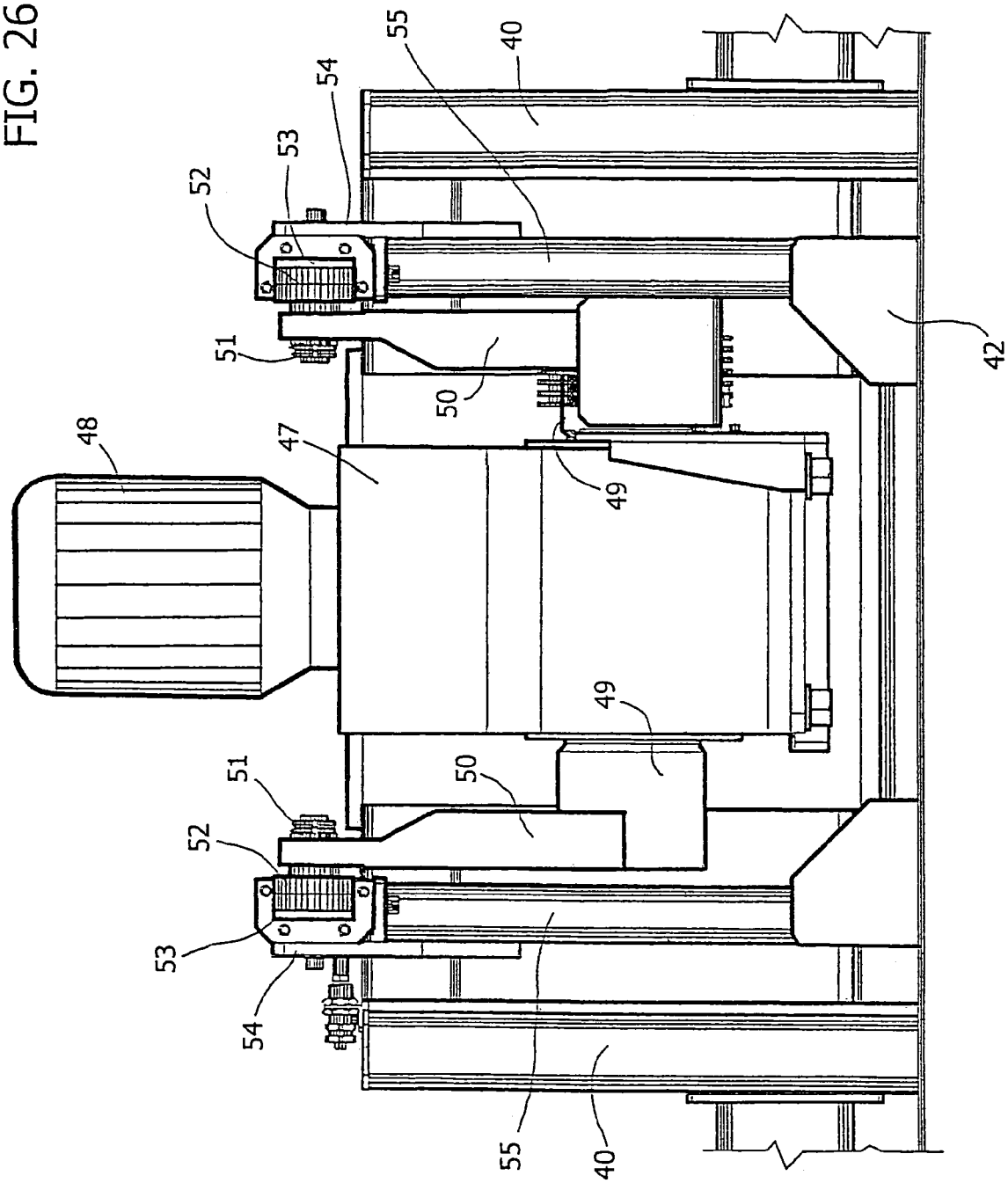
FIG. 26 is a schematic plan view of a part of the aforesaid arrangement of translation in the first operative condition illustrated in FIG. 24.

The gate represented, designated by 3a, comprises a bottom structure 20, at two longitudinal ends of which there are fixed respective assemblies 21 bearing means for slidable coupling to the guides 4, 4a, said means not being visible herein but described in what follows with reference to FIGS. 24-26. The structure 20 supports a top framework 22, which forms the gate proper, bearing the positioning tools designed to engage the side and top parts of the motor-vehicle body in such a way as to clamp them in a precise position during execution of the welding operations on the station 1.

Associated to each assembly 21 is a support 23 for a wheel 24 mounted on a vertical axis, which forms part of a system for hooking and releasing the gates 3 to/from the respective tractors 11a, 11b, described hereinafter.

Figure 22:
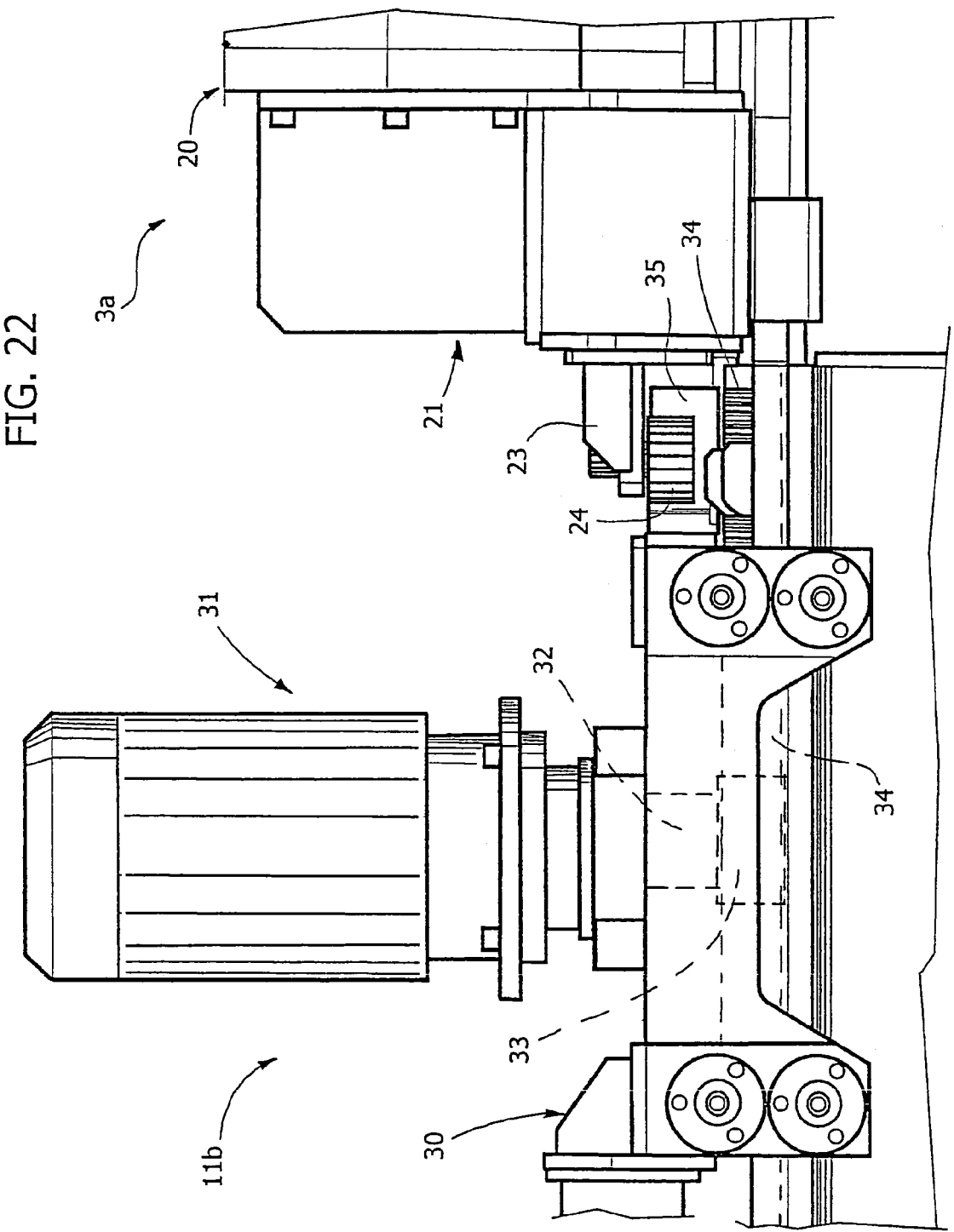
FIGS. 22 and 23 are, respectively, a schematic perspective view and a side view of a tractor for moving, which forms part of the system according to the invention.
Figure 23:
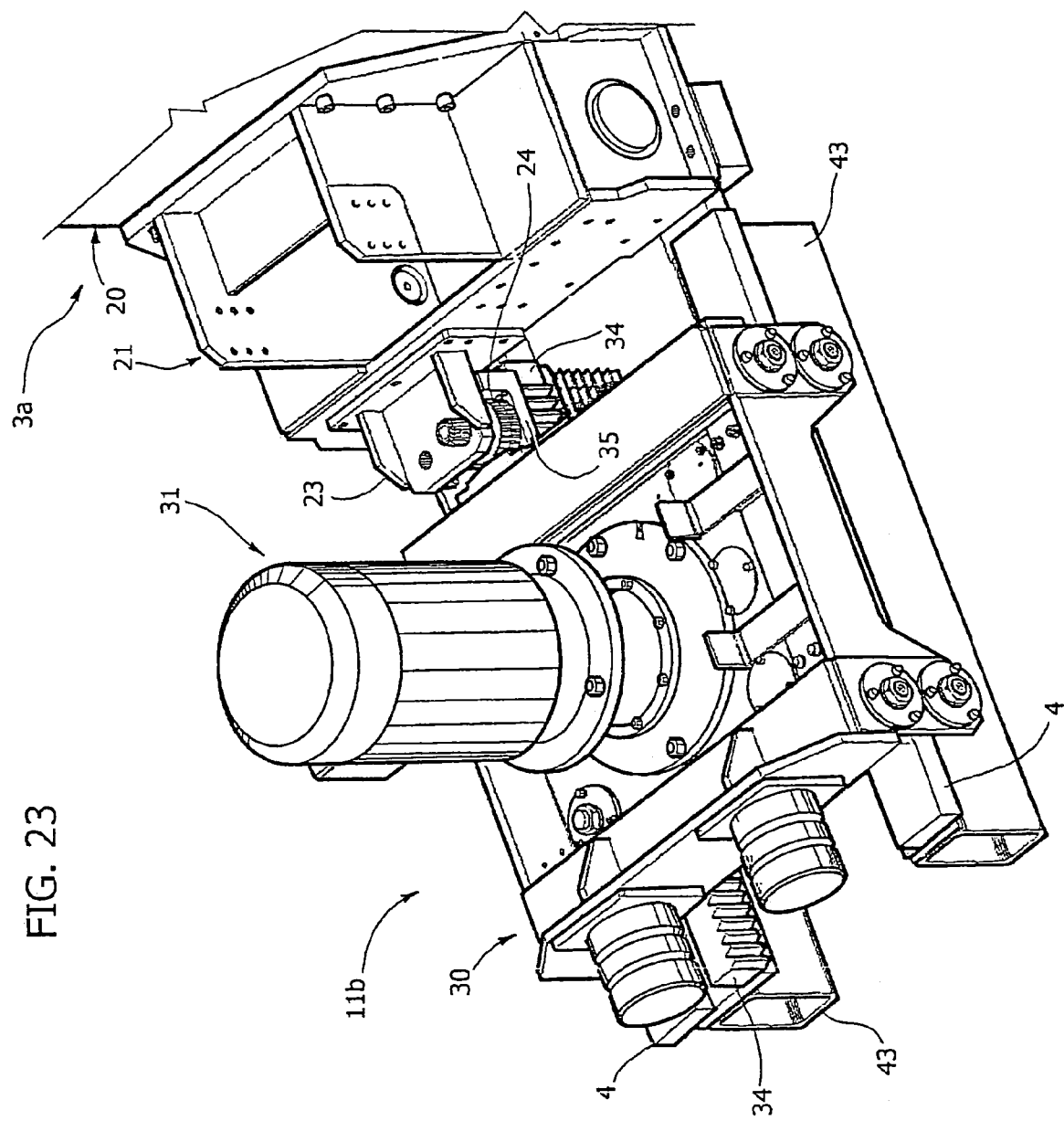

FIGS. 22 and 23 represent one of the tractors forming part of the system according to the invention, and in particular one of the tractors 11b. Likewise visible in said figures is the part of a gate 3a facing said tractor.

The tractor 11b substantially comprises a carriage 30, which carries, at the bottom, means for slidable coupling to the guides 4, said means, of a type in themselves known, not being visible in the figure and comprising, for example, a set of wheels. The carriage supports a gearmotor assembly 31, mounted in a vertical direction and in such a way that the end of the respective actuation shaft 32 (visible hatched in FIG. 22) projects at the bottom of the carriage itself. Fixed at the end of the shaft 32 is a pinion 33, meshing on of a rack 34, fixed along a guide 4 (the rack 34 comprises, of course, a stretch also corresponding to a respective translatable element 8a, 8b, and possibly a stretch corresponding to a mobile guide portion 4a). The assembly 31 can be actuated selectively, with modalities in themselves known, so as to obtain rotation of the shaft 32 in one direction or in the other in order to be able to displace the tractor 11b in two opposite directions along the guides via the aforesaid pinion-rack system.

As may be seen in FIGS. 22 and 23, fixed at the end of the carriage 30 facing the gate 3a is a sectional element 35 having a substantially U-shaped cross section, so as to be able to receive the wheel 24 associated to the support 23 of the gate 3a.

It should be borne in mind that the tractors 11a are of construction similar to the tractors 11b but with an arrangement specular with respect to the one represented schematically in FIGS. 22 and 23.

As may be appreciated, in the condition represented in FIGS. 22 and 23, in which the wheel 24 is within the groove of the sectional element 35, the tractor 11b and the gate 3a are engaged with one another, so that the former will be able to push or pull the latter with itself along the respective guide 4.

Disengagement between tractor and gate is obtained via sliding of the wheel 24 in the sectional element 35 until it exits from the latter, which is obtained when one of the two elements is translated in a lateral direction with respect to the other.

Figure 3:
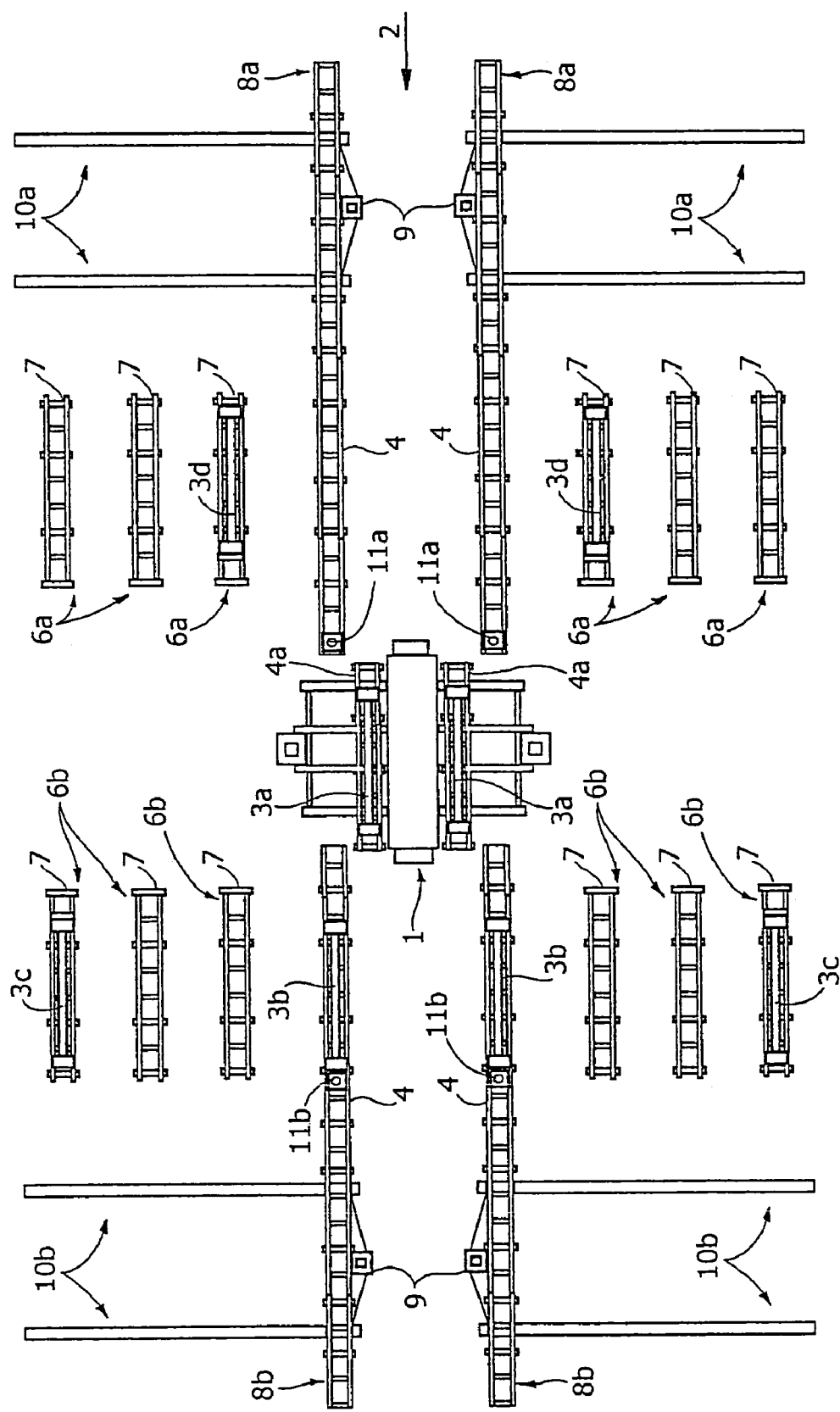
Figure 4:
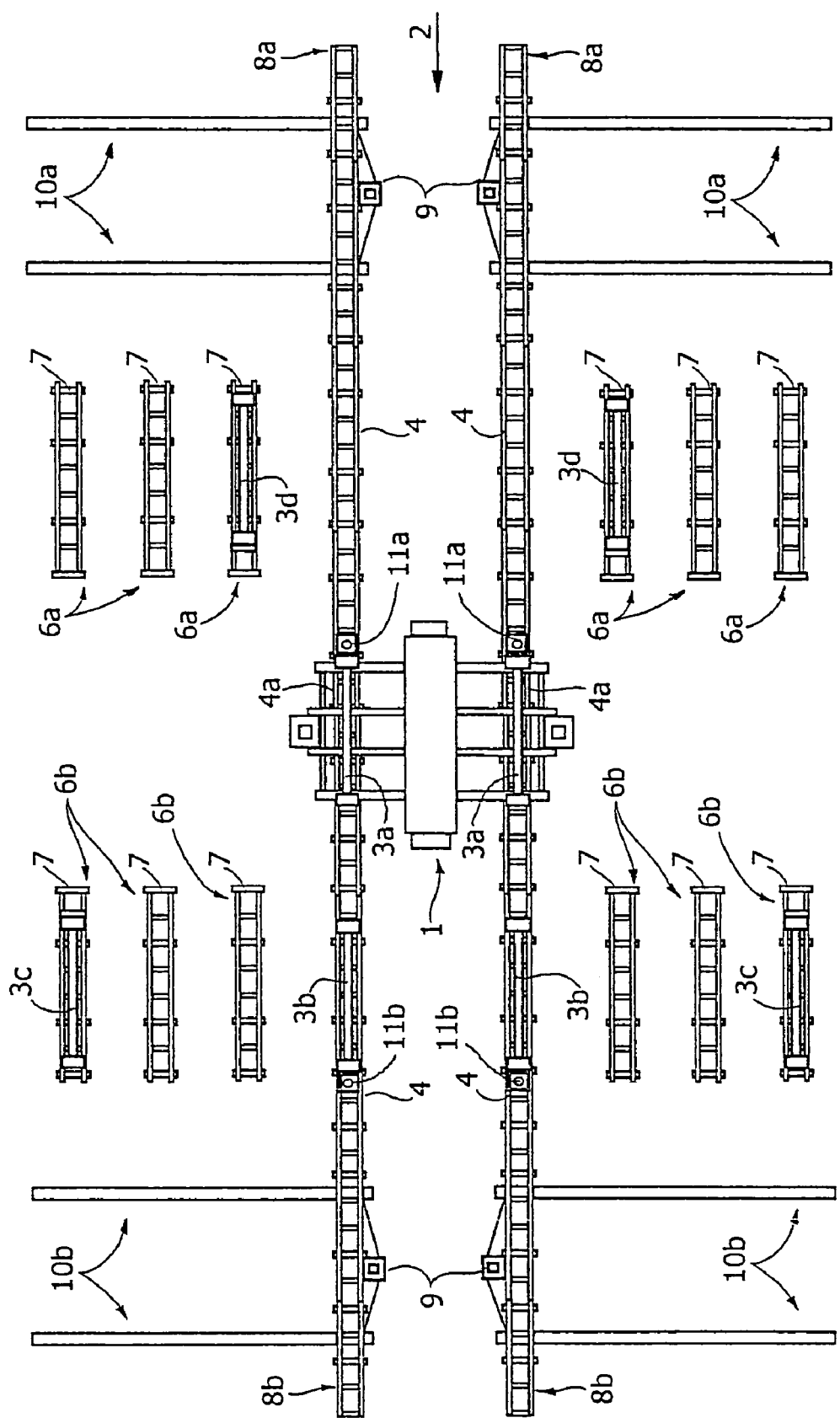
Figure 5:
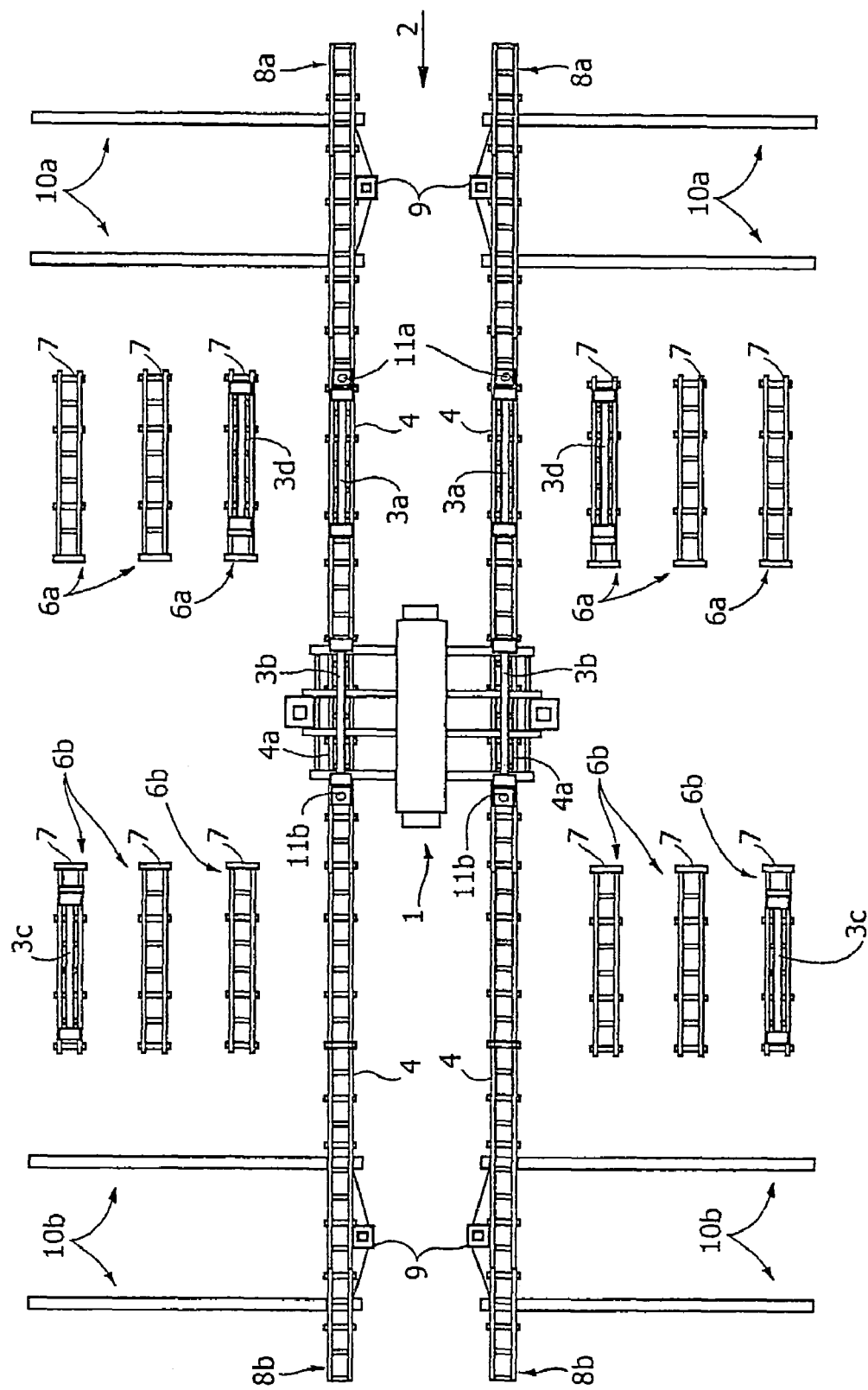
Figure 6:
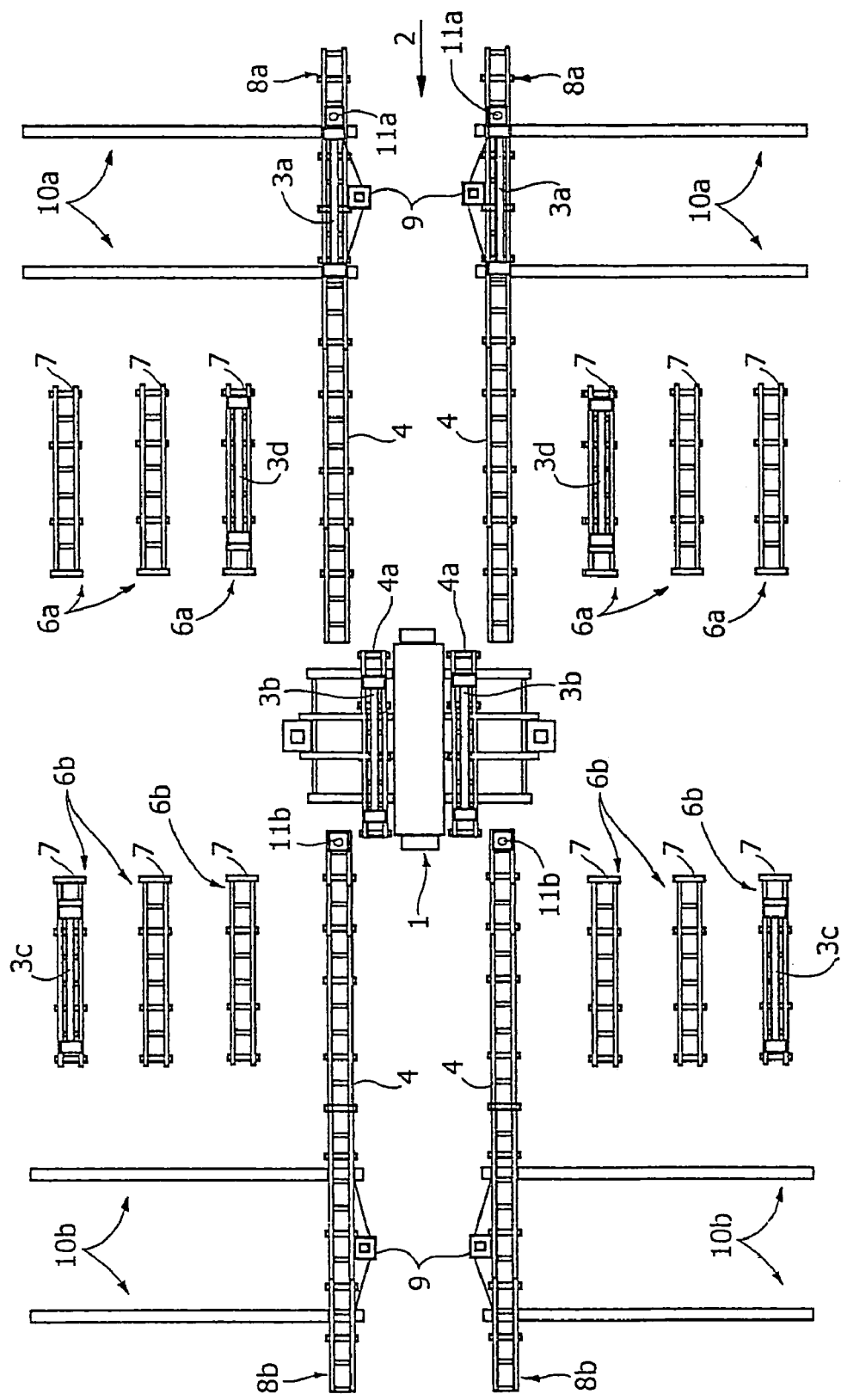
Figure 7:
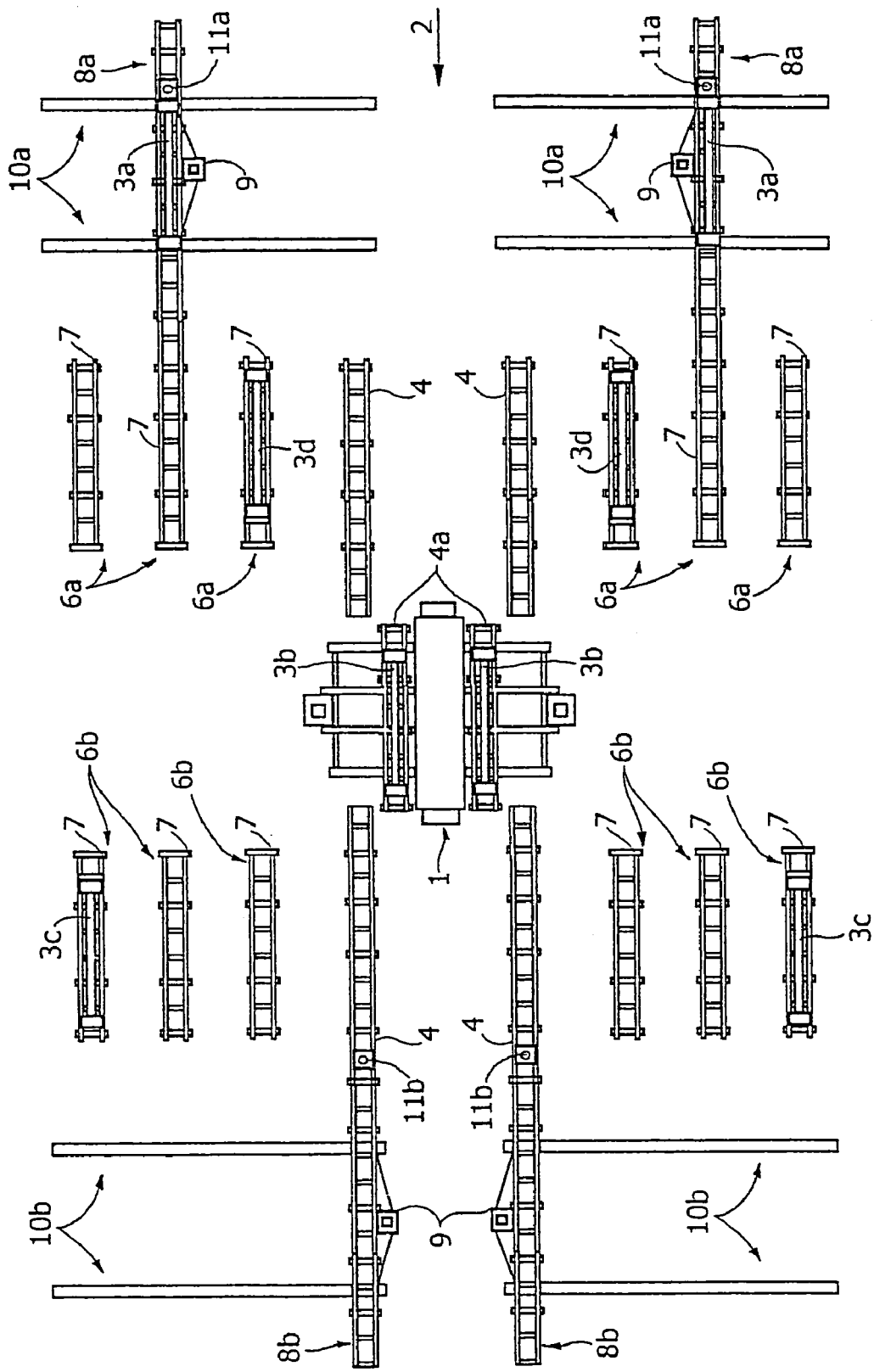
Figure 9:
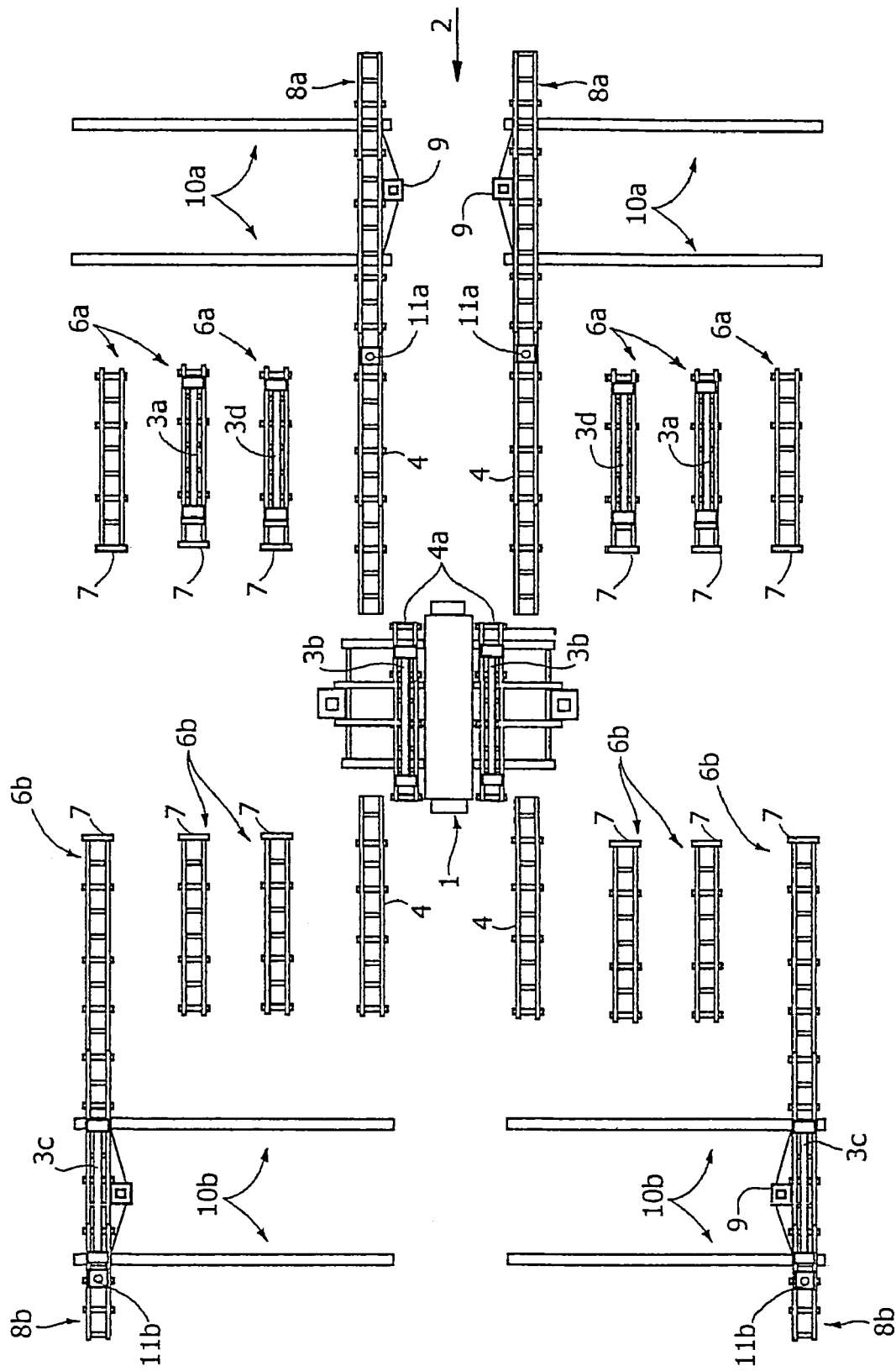
Figure 10:
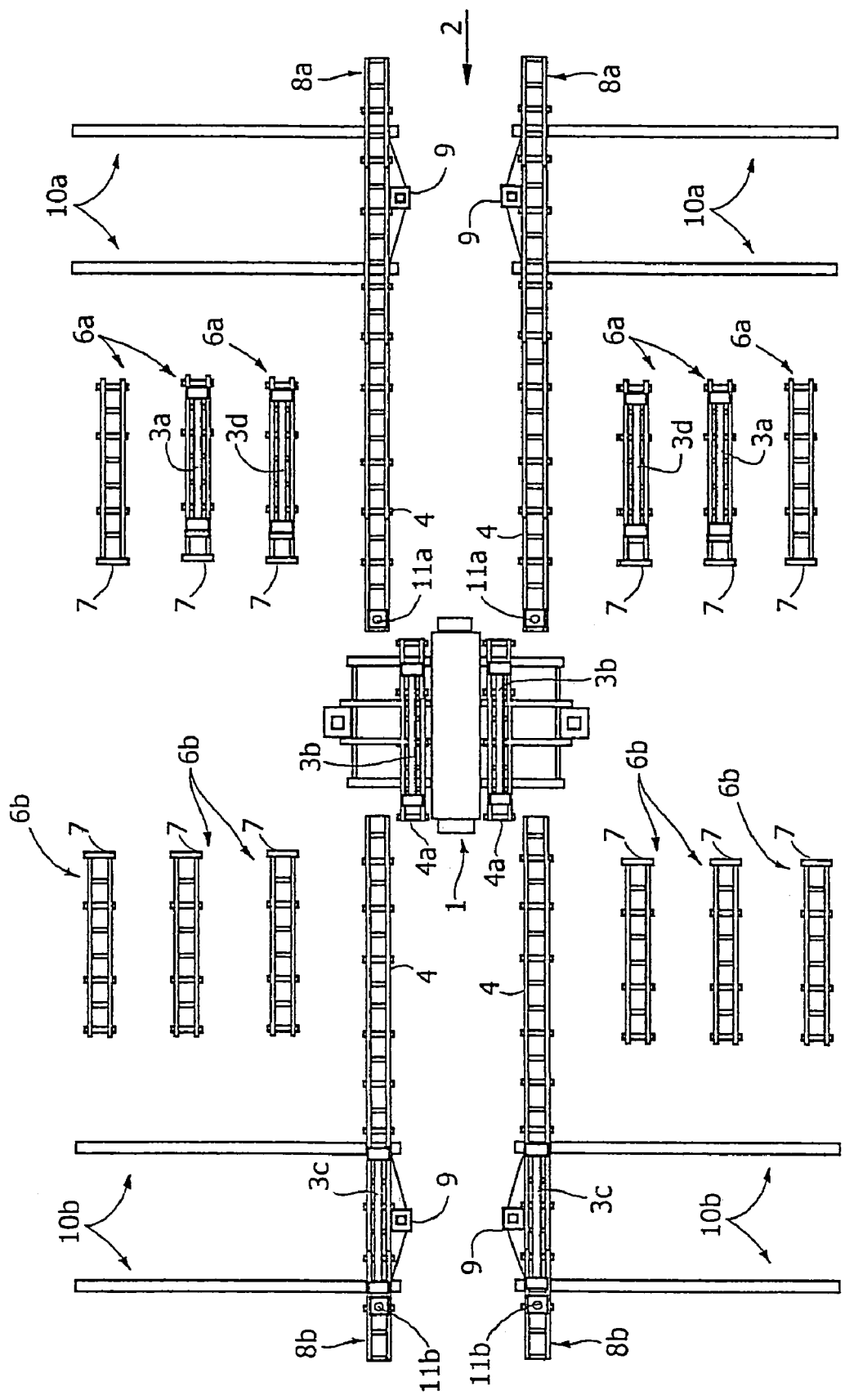

For example, disengagement is obtained when the gates 3 of a pair are brought into the respective closed condition on the station 1, via translation of the mobile guide portions 4a, with the tractors that remain instead static on the fixed guides 4 (see, for example, what is described with reference to the gates 3a and the tractors 11a in relation to FIG. 3), or else when the elements 8a, 8b are translated laterally for return into alignment with respect to the guides 4, after parking of the gates 3 in respective stations 6a, 6b (see, for example, what is described with reference to the elements 8a, to the tractors 11a and to the stations 6a, in relation to FIG. 9).

Engagement between tractor and gate is obtained, instead, when the wheel 23 is brought within the groove of the sectional element 35, which occurs when one of the two elements is translated for being brought into alignment with respect to the other.

Figure 8:
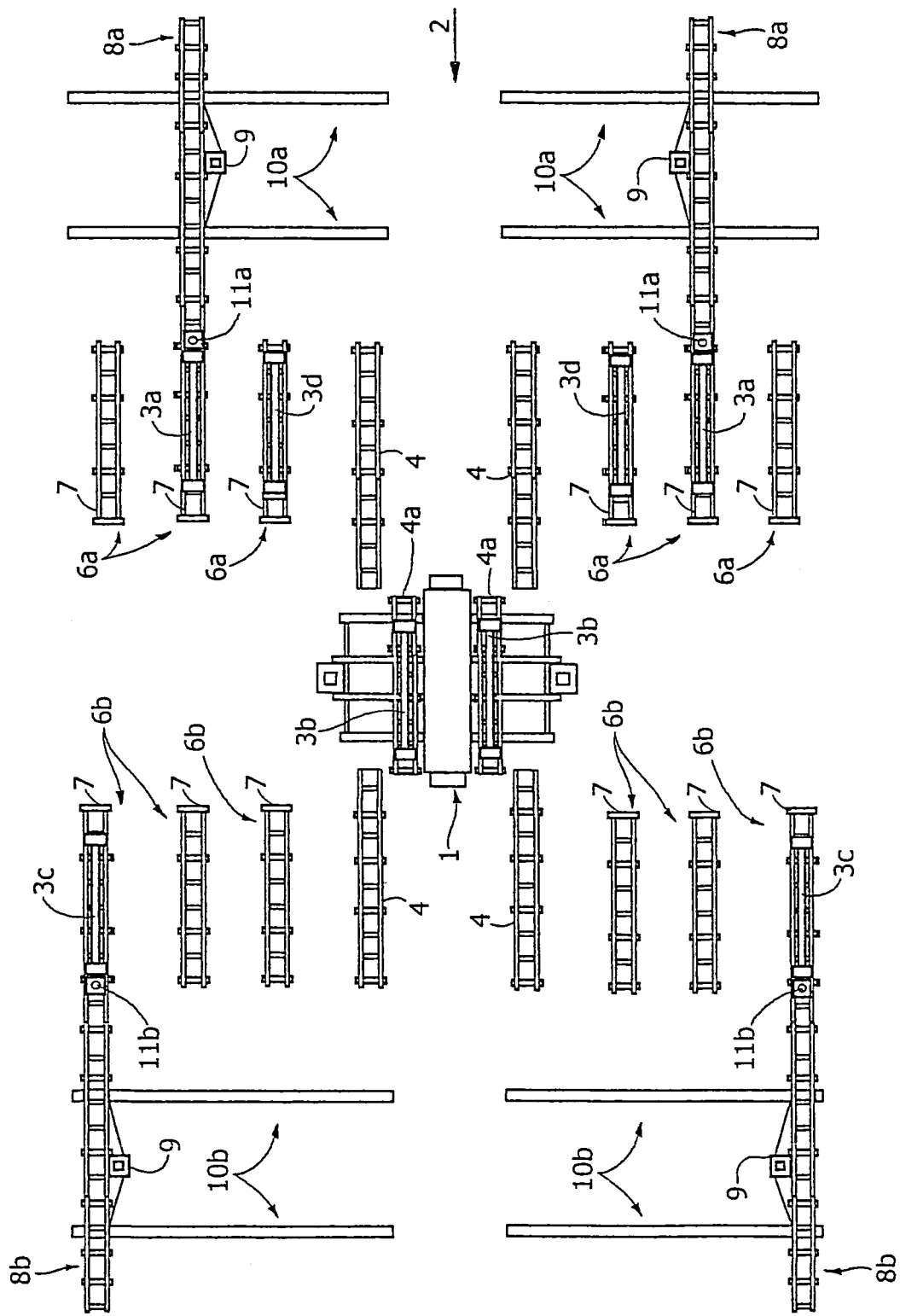
Figure 11:
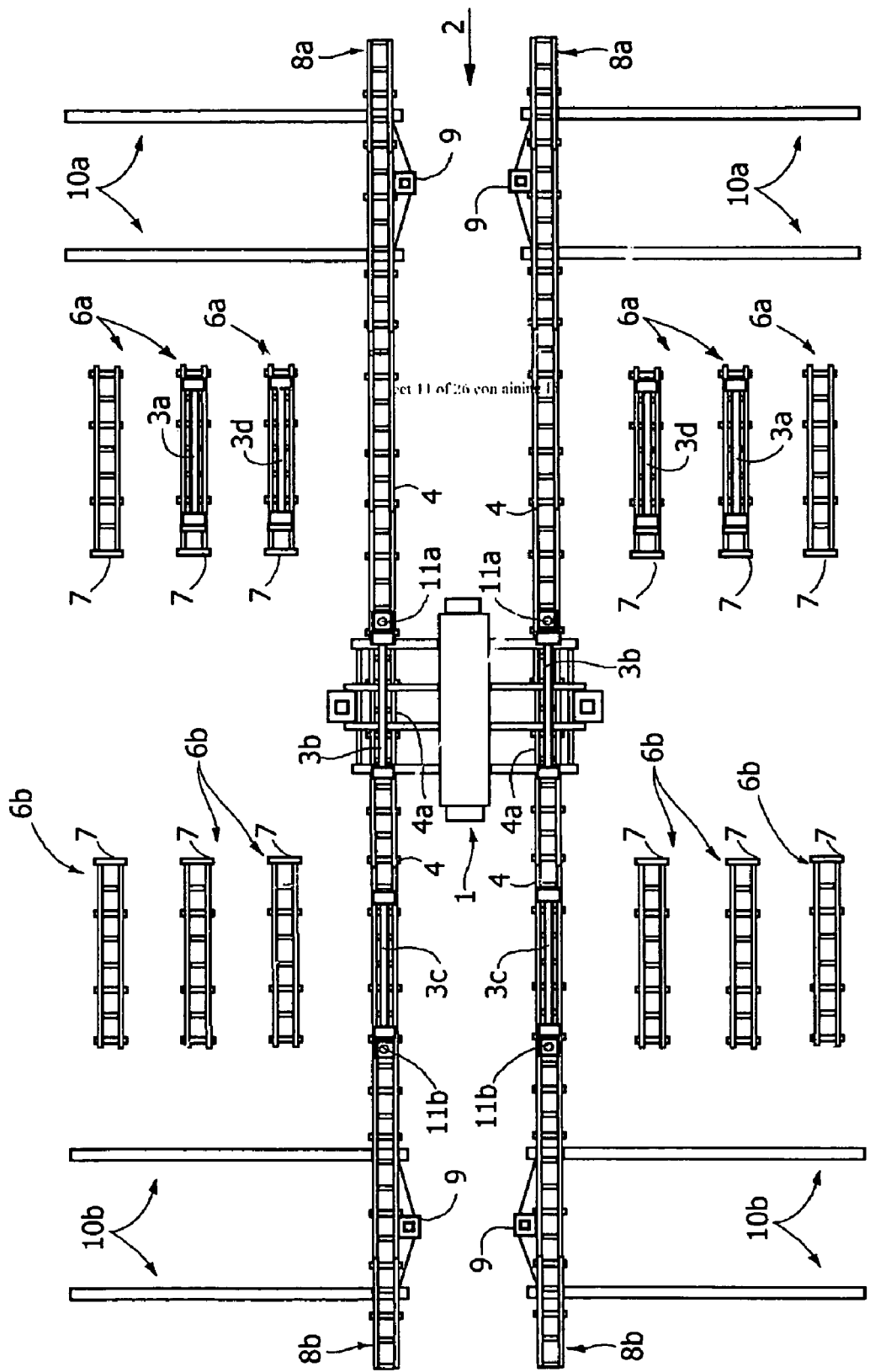
Figure 12:
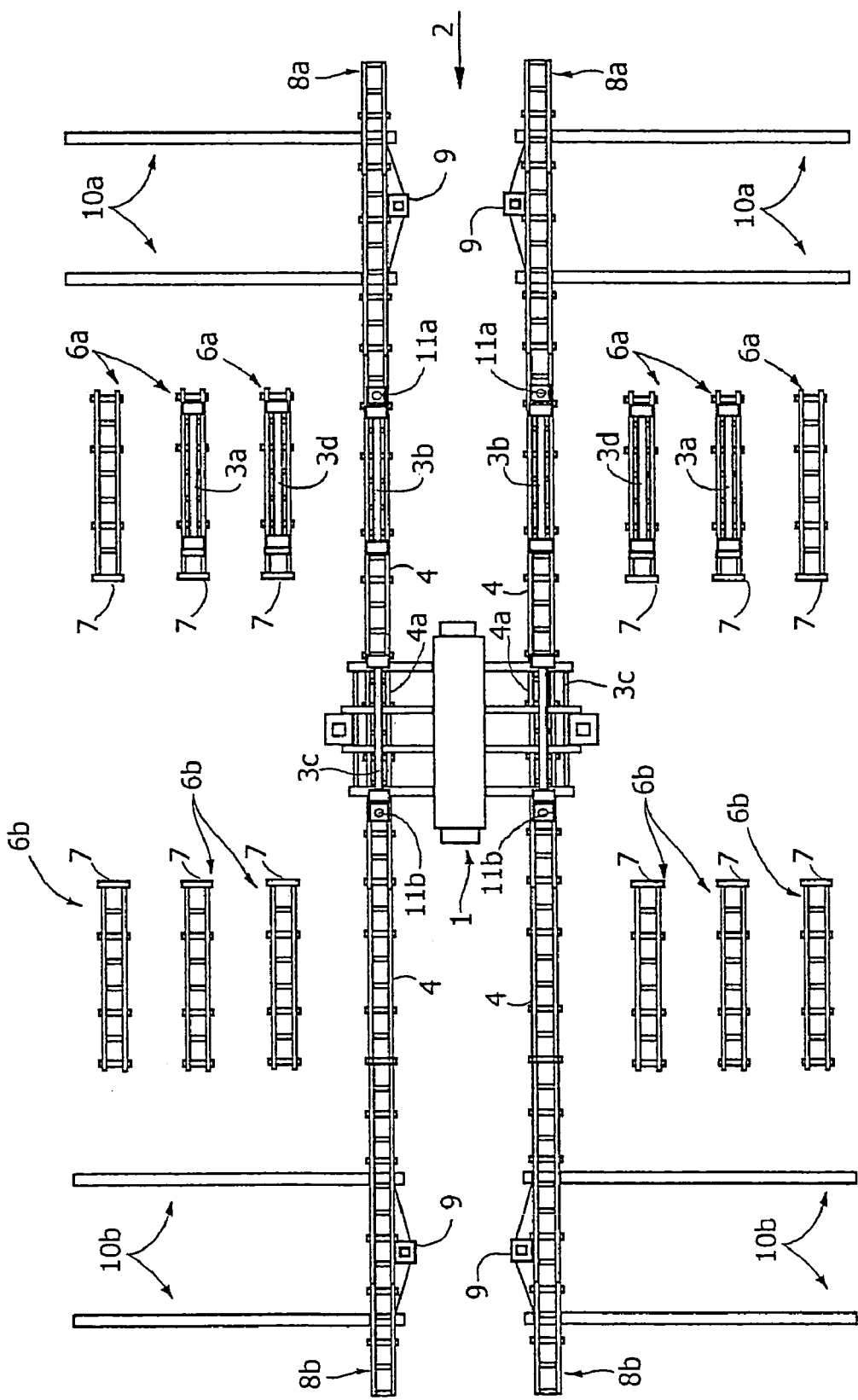
Figure 13:
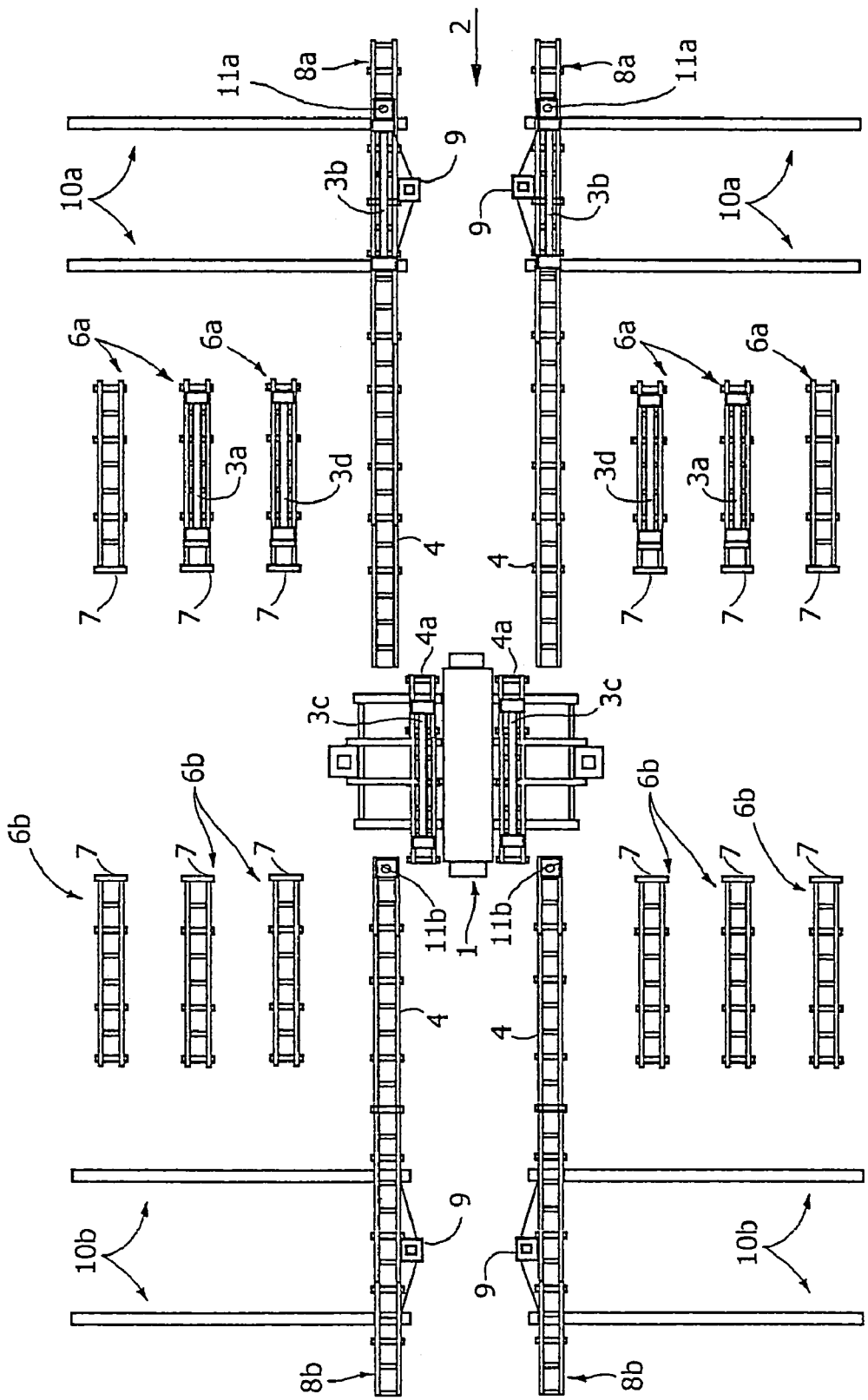
Figure 14:
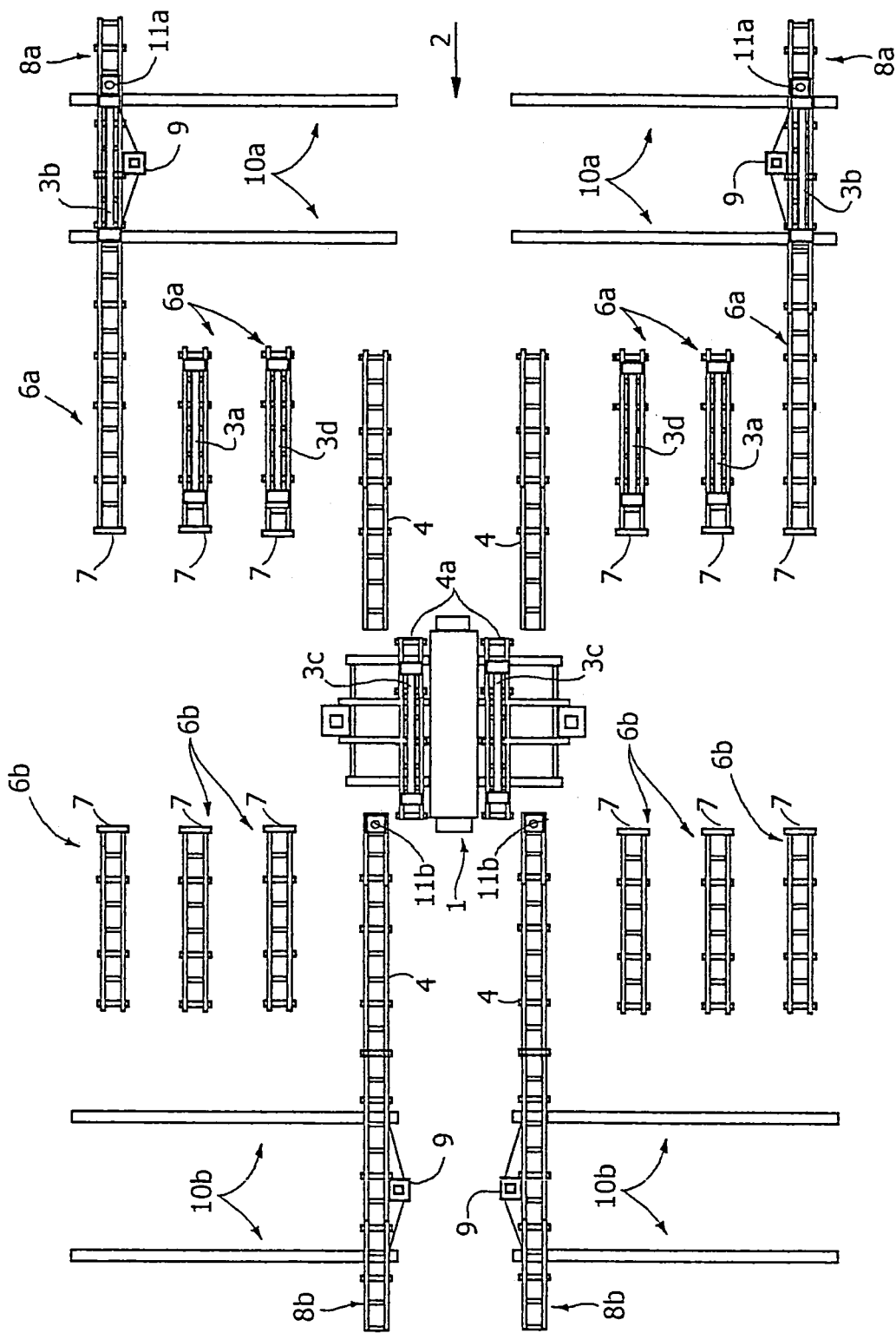
Figure 15:
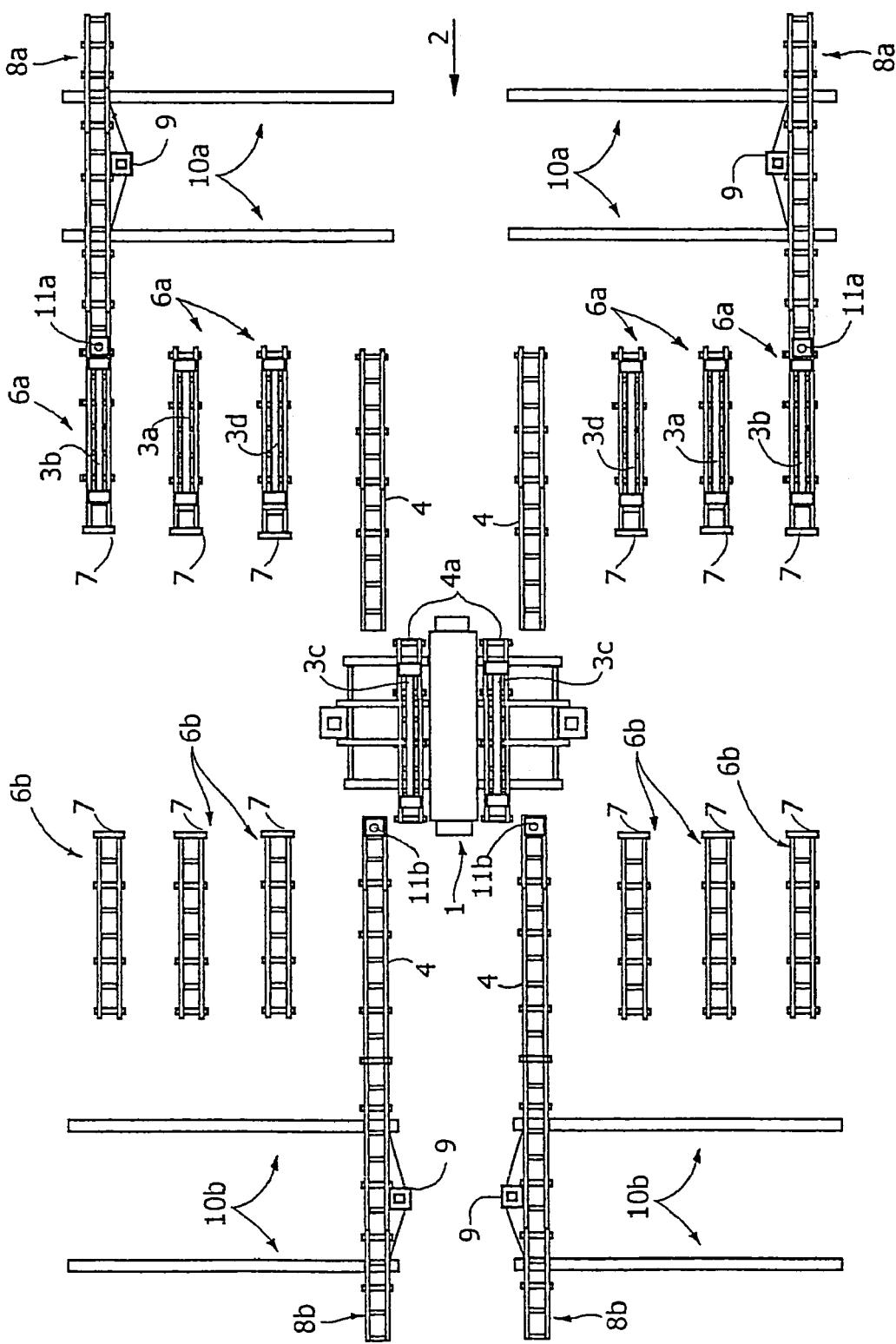
Figure 16:
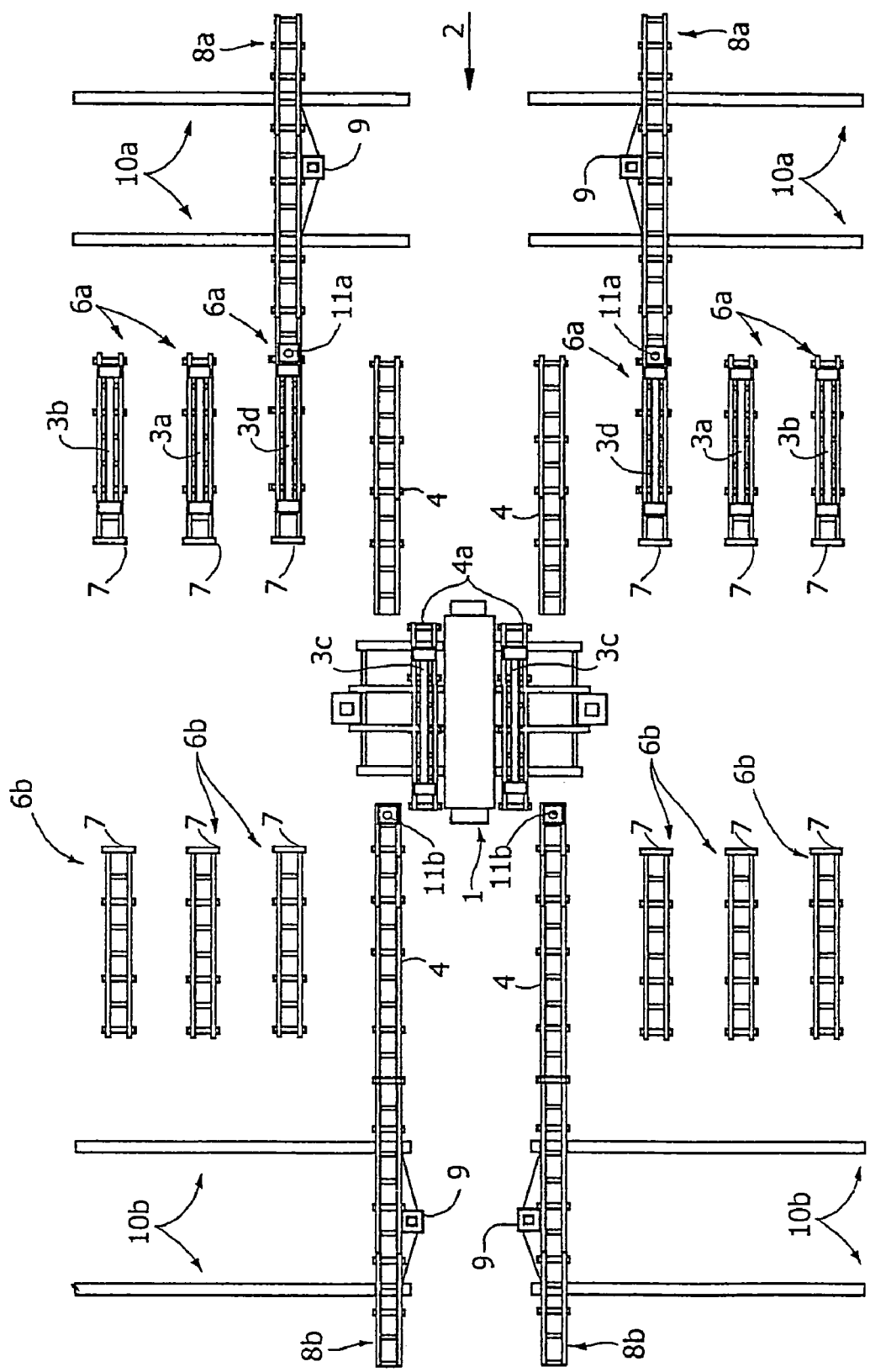
Figure 17:
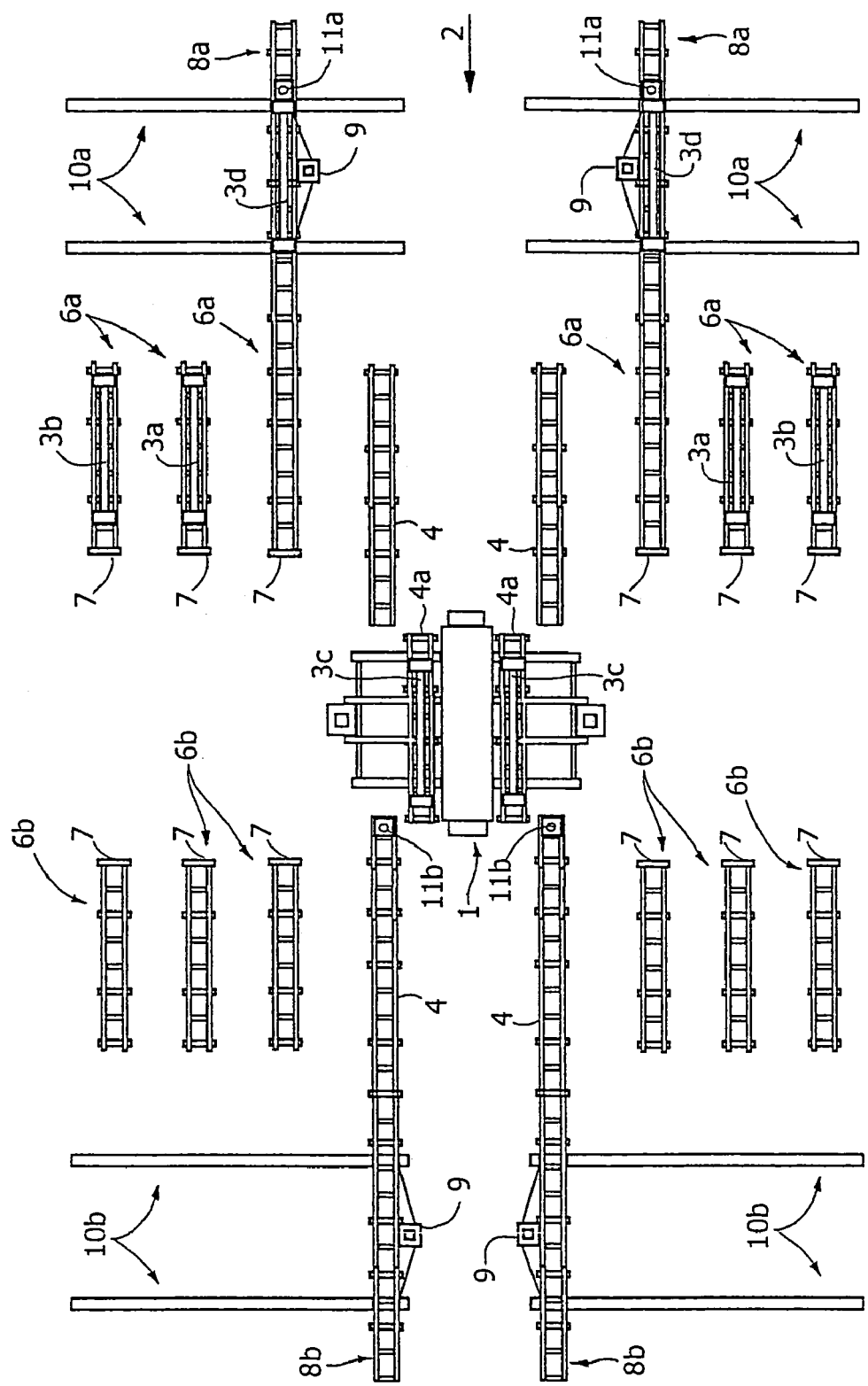
Figure 18:
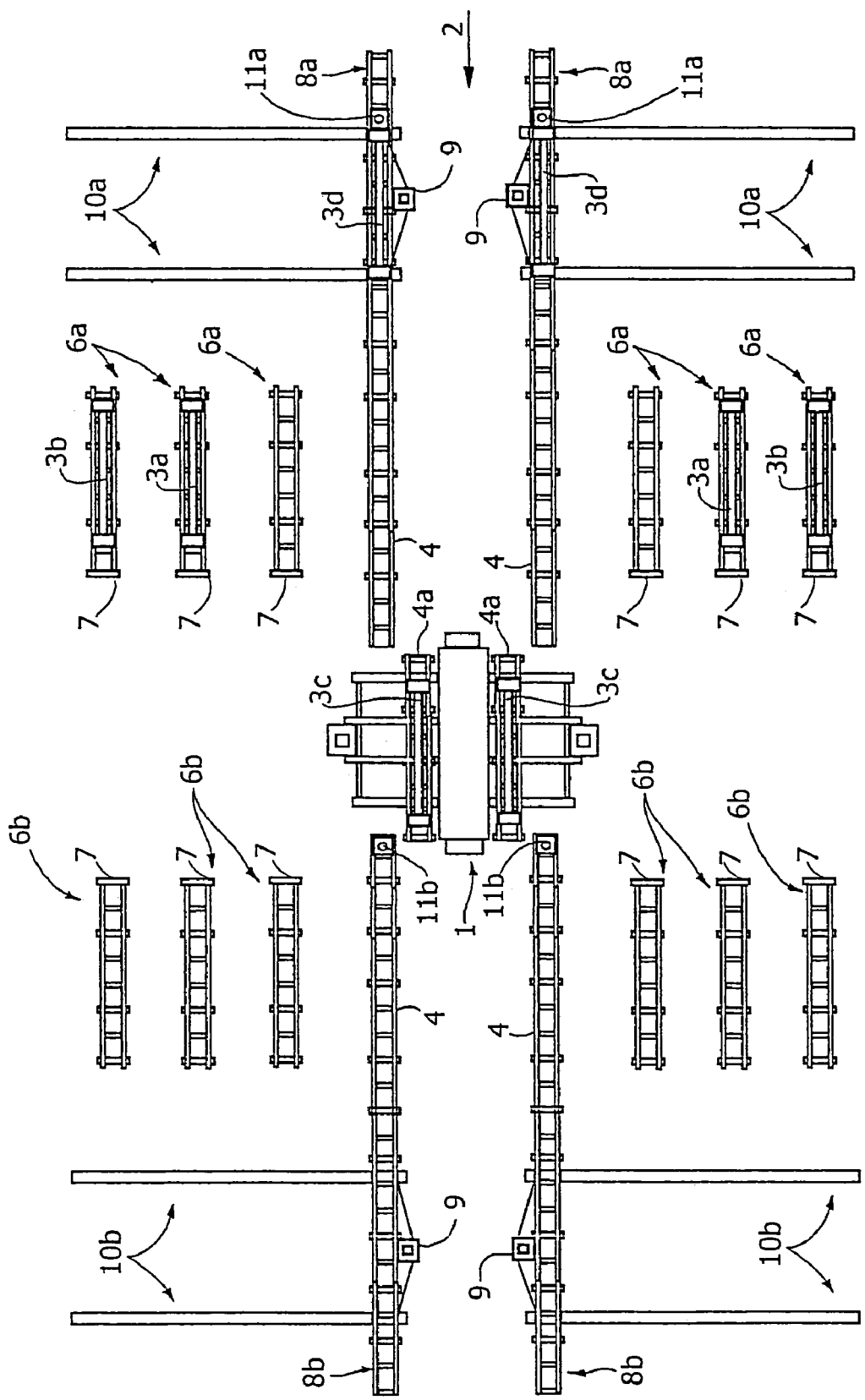
Figure 19:
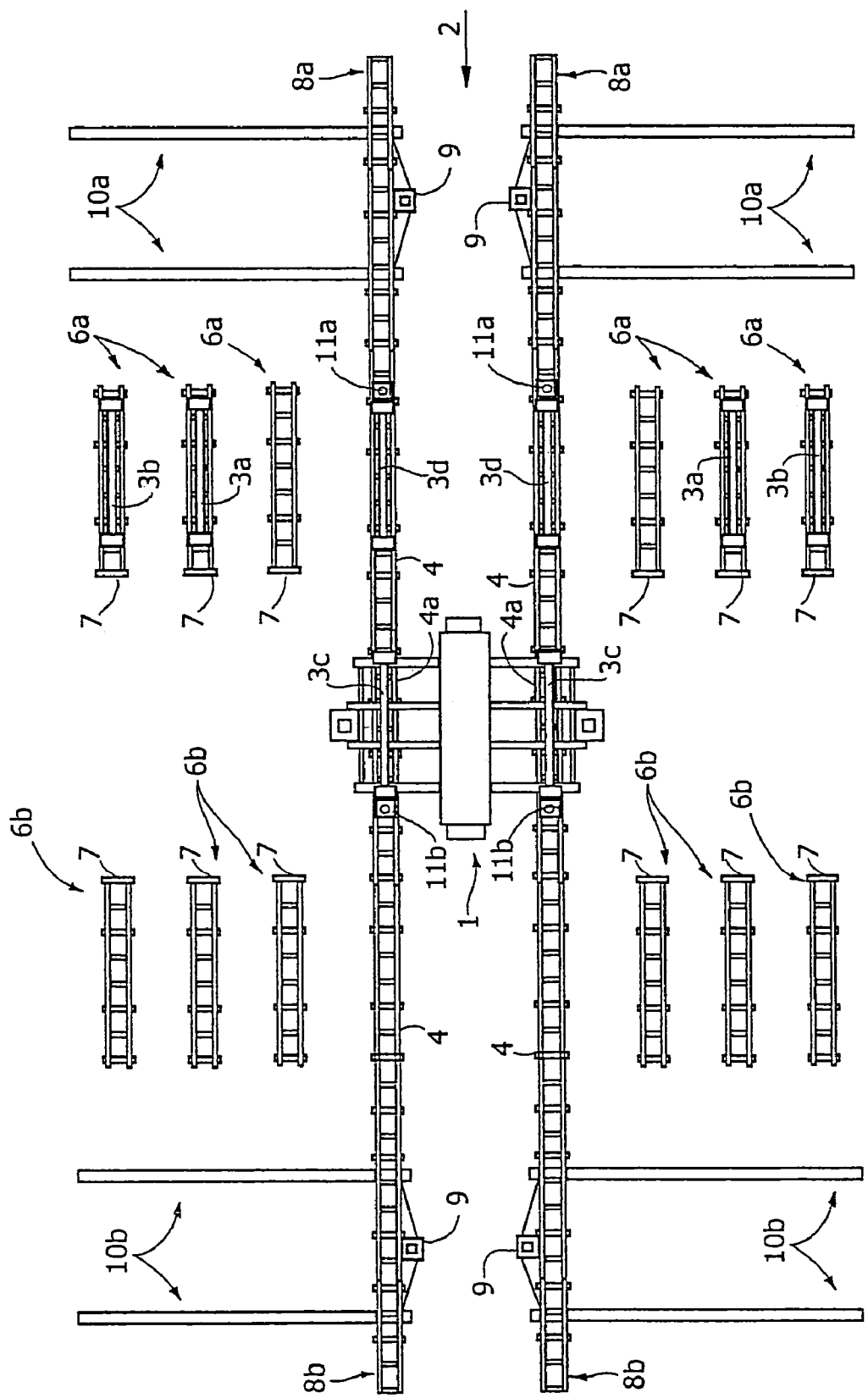
Figure 20:
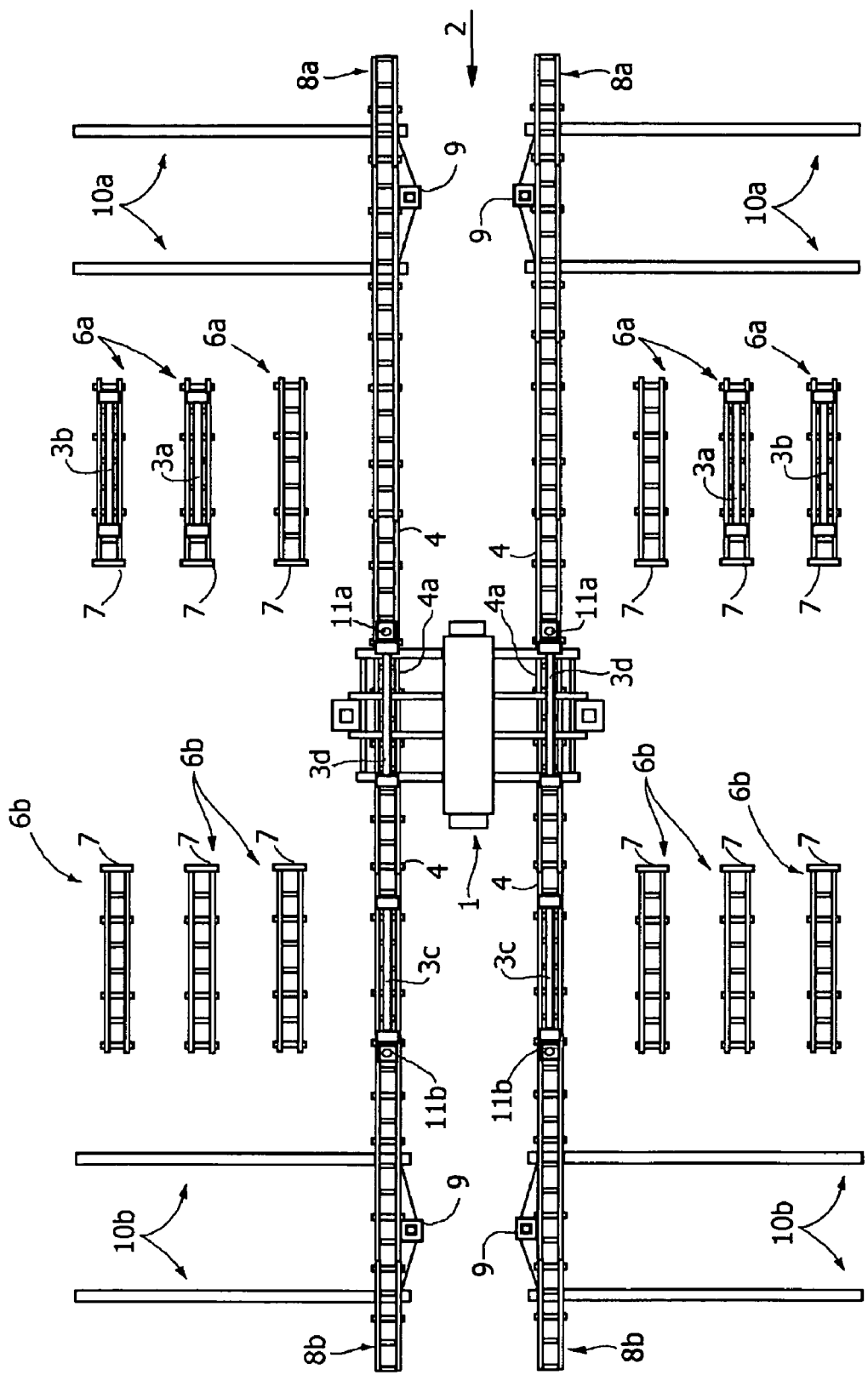

For example, said engagement is obtained when the gates 3 of one pair are brought into the respective open condition on the station 1 (see, for example, what is described with reference to the gates 3b and to the tractors 11a in relation to FIG. 11), or else when the elements 8a, 8b are brought into alignment with the respective stations 6a, 6b for the purposes of picking up new gates (see, for example, what is described with reference to the elements 8b, the tractors 11b, the gates 3c and the stations 6b, in relation to FIG. 8).

FIGS. 24, 25 and 26 are schematic illustrations of a device used for moving the gates 3 between the respective open and closed conditions, provided at the welding station 1.

With particular reference to FIGS. 24 and 25, the station 1 includes a fixed supporting structure, comprising longitudinal side members 40, to each of which are associated respective sectional guide elements 41. Slidably coupled to the sectional guide elements 41, with modalities in themselves known (for example, via wheels), is a slide 42.

The slide 42 comprises fixed supports 43 for the guide portions 4a designed to support the gates. It is to be noted that in FIGS. 24 and 25, only the bottom part of a gate 3a is represented, i.e., its bottom structure 20, where there is visible one of the assemblies 21 bearing the support 23 for the wheel 24 that forms part of the system for engagement and disengagement between the gate and the tractor, as described previously. As may be seen, the assemblies 21 further comprise wheels 44 for resting on the guide portions 4a (and obviously on the guides 4), as well as substantially L-shaped sectional elements 45, set opposite to one another, which, combined with wheels 46, guarantee the correct position of rolling of the wheels 44 on the guides 4a (and 4).

A gearmotor assembly 47-48 is rendered fixed to the longitudinal members 40. As illustrated in FIG. 26, projecting laterally from the gearmotor 47-48 are the two ends of a respective actuation shaft 49, to each of which is fixedly coupled a respective lever 50. The end of each lever 50 opposite to that of fixing to the shaft 49 carries a pin 51 for a respective wheel 52. Each wheel 52 is inserted slidably in a respective C-shaped sectional guide element 53, which extends vertically therefrom. The two sectional elements 53 are set opposite to one another and each one is associated to a respective bracket 54, connected via longitudinal members 55 to the slide 42.

The arrangement described herein with reference to FIGS. 24-26 is configured as a connecting rod-crank system, actuated by the gearmotor assembly 47, 48, where the rotation of the connecting rod-crank system is approximately through 180° and occurs on a vertical plane parallel to the direction of displacement of the slide 42 and hence of the guide portions 4a carried thereby.

FIG. 24 illustrates the case of a gate 3a in the open condition, i.e., in which the guide portions 4a are aligned to the guides 4 (see, for example, FIG. 1 or FIG. 2). In said condition, each end of the levers 50, which bear the wheels 52, faces the side opposite to the slide 42.

When the gate 3a is to be brought into the respective closed condition, the gearmotor assembly 47, 48 is actuated. Rotation in a clockwise direction of the shaft 49 of the gearmotor 47, 48 brings about the angular movement of the levers 50, substantially through 180°, and hence sliding of the wheels 52 within the sectional guide elements 53 (see FIG. 26), which in turn brings about a consequent push on the brackets 54 connected to the slide 42 and hence movement of the latter away with respect to the gearmotor assembly 47, 48, until the position illustrated in FIG. 25 is reached. As may be appreciated, the sliding of the slide 42 on the respective sectional guide elements 41 brings about translation of the guide portions 4a that support the gate 3a, which thus reaches the respective closed condition. In said closed condition, the gate is clamped mechanically in the operative position, which is necessary for execution of the welding operations on the station 1, with means in themselves known.

To bring the gate 3a back into the open condition a reverse sequence with respect to the one just described will be followed, and thus the gate will be released mechanically from its operative position, and the gearmotor 47, 48 will be actuated in a direction opposite to the previous one, thus bringing the slide 42 with the guide portions 41, and hence the gate 3a, back into the condition represented in FIG. 24.

The system of course envisages two arrangements of the type illustrated in FIGS. 24-26, each set on a respective side of the welding station 1 with respect to the conveying line 2 of the motor-vehicle bodies.

Finally, it is evident that all of the operations previously described with reference to the operation of the system according to the invention are controlled automatically, under the supervision of an appropriate central control unit, of a type in itself known to the person skilled in the branch.

Of course, without prejudice to the principle of the invention, the details of construction and the embodiments may vary widely with respect to what is described and illustrated herein purely by way of example.

What is claimed is:

1. A system for welding structures consisting of elements of pressed sheet metal, designed to operate in an automatic way on a plurality of different types of structures to be welded, comprising:

a welding station;

a conveying line, for carrying the structures to be welded through the welding station, or at least part thereof;

a plurality of pairs of side gates provided with means for clamping the structures to be welded and capable of being guided along the conveying line, the clamping means provided on the side gates of each pair being adapted to a configuration of a corresponding type of structure to be welded;

a first and a second store of side gates, located downstream and upstream of the welding station, respectively, each store comprising one or more parking stations on two sides of the conveying line, each parking station having a guide section, designed to support in a slidable way a side gate in a respective parking position, wherein:

the side gates are mobile on guide means provided along each longitudinal side of the conveying line, to enable replacement, according to the type of structure to be welded, of the pair of side gates that is located in the vicinity of the welding station, each side gate being displaceable between a position, close to the welding station, and at least one position, remote from the welding station, each pair of side gates, when located in said position close to the welding station, is moreover displaceable between an open condition and a closed condition, in which the respective side gates are operative for clamping parts of the structure to be welded in a configuration of welding on the welding station, the system moreover comprises means for moving the side gates, for their displacement between the respective position close to the welding station and parking position said means for moving comprising, for each longitudinal side of the conveying line, a first and a second tractor, independent with respect to said side gates, each tractor being selectively coupleable in an automatic way to side gates of different pairs, for the purposes of displacement said guide means comprise fixed guiding sections and first mobile guiding sections, each of said first mobile guiding sections being arranged in correspondence of the welding station and extending between a first and a second fixed guiding section, the first mobile guiding sections being mounted for sliding in a direction perpendicular to the longitudinal direction of the conveying line, for the purpose of displacing the side gates of one pair between the respective open and closed conditions, in the open position a first mobile guiding section being longitudinally aligned to the respective first and second fixed guide sections, and wherein:

each tractor comprises a carriage supporting a respective motor assembly, the carriage of the first tractor being mounted for movement onto said first fixed guiding section and the carriage of the second tractor being mounted for movement onto said section fixed guiding section, each side gets selectively coupleable, when in said position close to the welding station, either with said first tractor or with said second tractor, such that a side gate displaced by a tractor from one of said stores to the welding station can be subsequently displaced by the other tractor from the welding station to the other store, the guide means further comprises second mobile guiding sections, wherein each second mobile guiding section extends at an end of a respective fixed guiding section being remote from the welding station and is capable of being translated between a respective first position and one or more second positions, in its first position the second mobile guiding section being longitudinally aligned to the respective fixed guiding section and in its second position, or in each second position, the second mobile guiding section being longitudinally aligned to a respective guide section of a parking station, and the carriage of said first tractor is mounted for moving also onto the second mobile guiding section extending at the end of the first fixed guiding section remote from the welding station and the carriage of said second tractor is mounted for moving also onto the second mobile guiding section extending at the end of the second fixed guiding section remote from the welding station, for the purpose of displacing a side gate between said first mobile guiding section and a guide section of a respective store.

2. The system according to claim 1, wherein each side gate comprises a structure having two longitudinal ends, each end carrying respective first coupling means, and the carriage of each tractor carries, at an end thereof facing a respective longitudinal end of the structure of a side gate, second coupling means selectively engageable with said first coupling means, the first and the second coupling means being such that they can assume a condition of mutual engagement and a condition of release, the switching between the condition of engagement and the condition of release being determined by a translation of a tractor with respect to a gate, or vice-versa, according to a direction substantially perpendicular to the longitudinal direction of the conveying line, said translation being caused by a movement of a first mobile guiding section, onto which the tractor is standing, with respect to a guide section of a store, onto which the gate is standing.

3. The system according to claim 2, wherein at least one of said first and second coupling means comprises a seat longitudinally extending in a direction substantially perpendicular to the direction of movement of the tractor on said guide means and in that the other one of said first and second coupling means comprises a member that can engage in a slidable way in said seat.

4. The system according to claim 1, wherein associated to the second mobile guiding sections are respective motor and drive means, for the purposes of their translation according to a direction substantially perpendicular to the longitudinal direction of the conveying line.

5. The system according to claim 1, wherein said motor assembly has an actuation shaft bearing a pinion meshing on a rack fixed along at least part of said guide means.

6. The system according to claim 1, wherein the second mobile guiding sections are carried by respective slides, which can slide in a direction perpendicular to the conveying line, the sliding of each slide being determined by a connecting rod-crank system actuated by actuator means in a fixed position, with a rotation of said connecting rod-crank system substantially equal to 180°, which occurs on a vertical plane parallel to the direction of displacement of the slide.

7. The system according to claim 6, wherein said actuator means comprise an actuation shaft, to which there is fixedly coupled at least one lever, the end of the lever opposite to that of fixing to the shaft bearing a sliding member inserted in a slidable way in a respective guide, which extends longitudinally in a vertical direction and is rendered fixed to said slide.

* * * * *

UNITED STATES PATENT AND TRADEMARK OFFICE
CERTIFICATE OF CORRECTION

PATENT NO.         : 7,296,726 B2                                              Page 1 of 1
APPLICATION NO.    : 10/997115
DATED              : November 20, 2007
INVENTOR(S)        : Salvatore Caputo et al.

It is certified that error appears in the above-identified patent and that said Letters Patent is hereby corrected as shown below:

Column 5, Line 59; Delete "3c" and insert -- 3c, --, therefor.

Signed and Sealed this

Sixth Day of May, 2008

JON W. DUDAS
*Director of the United States Patent and Trademark Office*